United States Patent
Eklöf et al.

(10) Patent No.: US 11,968,571 B2
(45) Date of Patent: Apr. 23, 2024

(54) TARGET NODE, USER EQUIPMENT, SOURCE NODE AND METHODS PERFORMED THEREBY FOR HANDLING RECONFIGURATIONS OF THE USER EQUIPMENT DURING A CONDITIONAL HANDOVER

(71) Applicant: Telefonaktiebolaget LM Ericsson (publ), Stockholm (SE)

(72) Inventors: Cecilia Eklöf, Täby (SE); Oscar Ohlsson, Bromma (SE); Johan Rune, Lidingö (SE); Icaro L. J. Da Silva, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 270 days.

(21) Appl. No.: 17/421,482

(22) PCT Filed: Jan. 15, 2020

(86) PCT No.: PCT/SE2020/050034
§ 371 (c)(1),
(2) Date: Jul. 8, 2021

(87) PCT Pub. No.: WO2020/149782
PCT Pub. Date: Jul. 23, 2020

(65) Prior Publication Data
US 2022/0070741 A1 Mar. 3, 2022

Related U.S. Application Data

(60) Provisional application No. 62/793,905, filed on Jan. 18, 2019.

(51) Int. Cl.
*H04W 36/00* (2009.01)

(52) U.S. Cl.
CPC ... *H04W 36/0072* (2013.01); *H04W 36/0077* (2013.01); *H04W 36/00837* (2018.08)

(58) Field of Classification Search
CPC ......... H04W 36/0072; H04W 36/0077; H04W 36/00837
See application file for complete search history.

(56) References Cited

U.S. PATENT DOCUMENTS

| | | | |
|---|---|---|---|
| 2009/0046656 A1 | 2/2009 | Kitazoe et al. | |
| 2010/0254348 A1 | 10/2010 | Prakash et al. | |

(Continued)

FOREIGN PATENT DOCUMENTS

| | | |
|---|---|---|
| CN | 102202362 A | 9/2011 |
| WO | 2018132051 A1 | 7/2018 |
| WO | 2018194326 A1 | 10/2018 |

OTHER PUBLICATIONS

Ericsson, et al., "Conditional Handover", 3GPP TSG-RAN WG2 #97bis, May 15-19, 2017, pp. 1-5, Hangzhou, China, Tdoc R2-1704087.

(Continued)

*Primary Examiner* — Barry W Taylor
(74) *Attorney, Agent, or Firm* — COATS & BENNETT, PLLC

(57) ABSTRACT

A method performed by a target node (111) in a communications network (100). The method is for handling reconfigurations of a User Equipment (UE) (120) during a conditional handover. The target node (111) has received a conditional handover request for the UE (120) from a source node (110) and has sent a handover request acknowledgement to the source node (110) based on a current configuration of the UE (120). The target node (111) performs (401) synchronization and random access with the UE (120) based on the UE configuration used for the handover request acknowledgement. The target node (111) obtains (403), after performing (401) the synchronization, information regard- (Continued)

ing an updated configuration of the UE (120). The updated configuration has taken place since the handover request acknowledgement was sent to the source node (110). At least one of the following applies: i) the information is obtained from the UE (120) in a handover complete message, and ii) the information is obtained from the source node (110) at the time of the handover execution.

27 Claims, 16 Drawing Sheets

(56) References Cited

U.S. PATENT DOCUMENTS

| | | | |
|---|---|---|---|
| 2015/0105084 A1 | 4/2015 | Bontu et al. | |
| 2015/0350968 A1 | 12/2015 | Da Silva et al. | |
| 2019/0150037 A1* | 5/2019 | Mildh | H04W 36/0038 370/331 |
| 2020/0128447 A1* | 4/2020 | Ying | H04W 36/0009 |
| 2021/0051550 A1* | 2/2021 | Latheef | H04L 41/0816 |
| 2022/0201561 A1* | 6/2022 | Bin Redhwan | H04W 36/0061 |
| 2022/0201568 A1* | 6/2022 | Decarreau | H04W 36/0061 |
| 2022/0303845 A1* | 9/2022 | Van Der Velde | H04W 36/0058 |

OTHER PUBLICATIONS

Ericsson, "Conditional handover in LTE", 3GPP TSG RAN WG2 #103bis, Oct. 8-12, 2018, pp. 1-4, Chengdu, China, R2-1814319.

Nokia, et al., "Configuration Management for Conditional Handover", 3GPP TSG-RAN WG2 Meeting #101, Feb. 26-Mar. 2, 2018, pp. 1-3, Athens, Greece, R2-1803347.

3rd Generation Partnership Project, "Technical Specification Group Radio Access Network; NR; Radio Resource Control (RRC) protocol specification (Release 15)", 3GPP TS 38.331 v15.3.0, Sep. 1, 2018, pp. 1-445.

3rd Generation Partnership Project, "Technical Specification Group Radio Access Network; Evolved Universal Terrestrial Radio Access (E-UTRA); Radio Resource Control (RRC); Protocol specification (Release 15)", 3GPP TS 36.331 v15.3.0, Sep. 1, 2018, pp. 1-918.

* cited by examiner

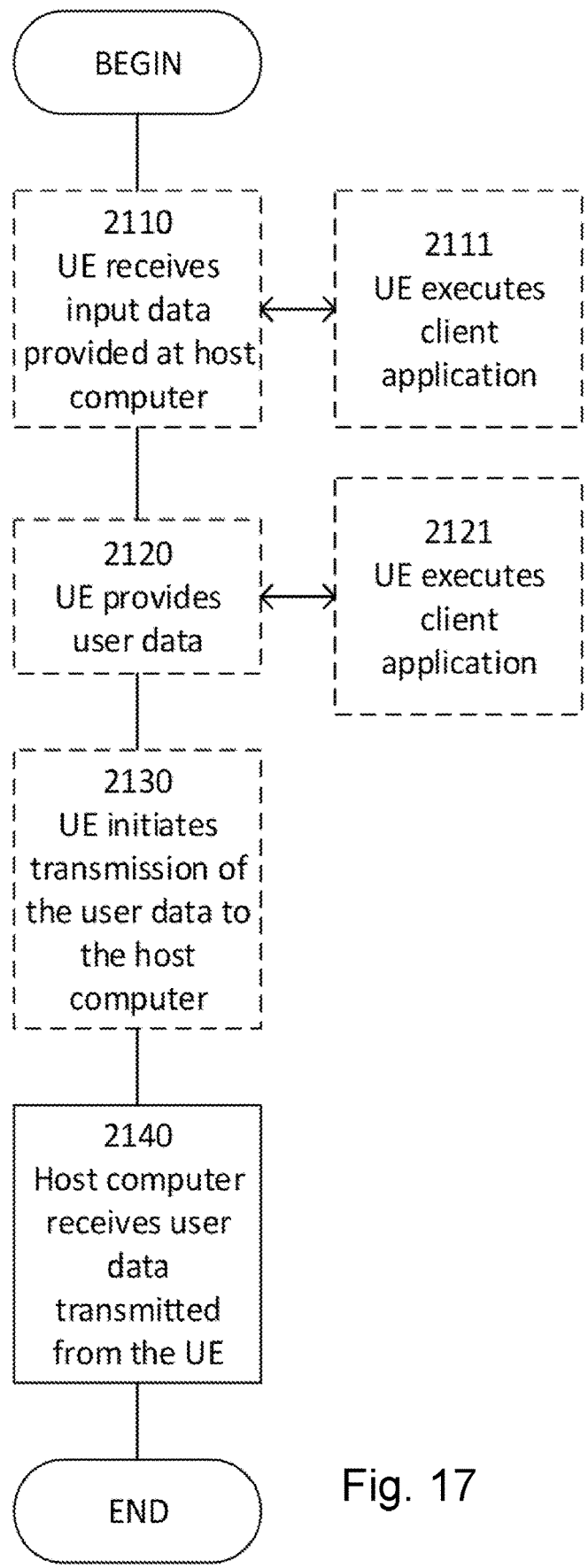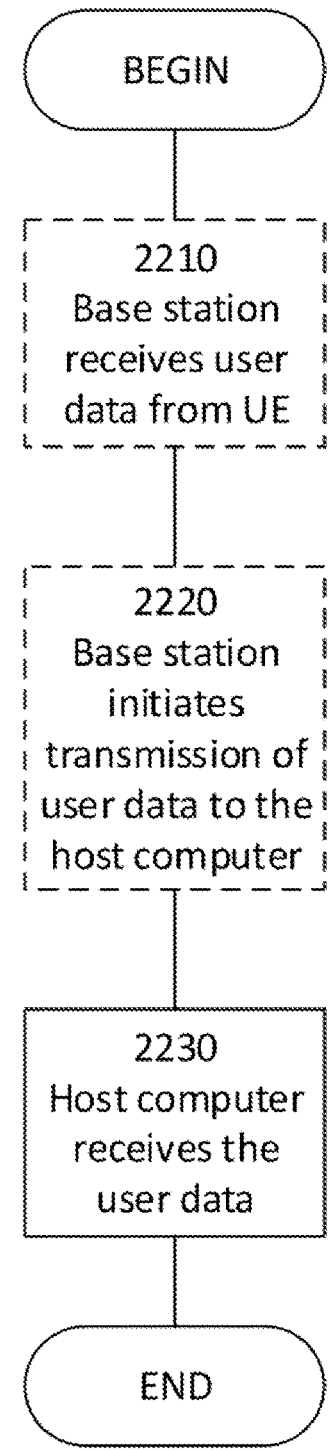
Fig. 17
Fig. 18

TARGET NODE, USER EQUIPMENT, SOURCE NODE AND METHODS PERFORMED THEREBY FOR HANDLING RECONFIGURATIONS OF THE USER EQUIPMENT DURING A CONDITIONAL HANDOVER

TECHNICAL FIELD

Embodiments herein relate to methods and devices for handling reconfigurations of a User Equipment (UE) during a conditional handover. More particularly, the present disclosure relates generally to a target node and methods performed thereby for handling reconfigurations of a UE during a conditional handover. The present disclosure also relates generally to the UE, and methods performed thereby for handling reconfigurations of the UE during a conditional handover. The present disclosure also relates generally to a source node, and methods performed thereby for handling reconfigurations of the UE during a conditional handover.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam, individually, or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node. The CN comprises of several types of core network functions which are responsible for various functions such as handling the mobility of the UE, interconnecting to data network, packet routing and forwarding, among other responsibilities.

Conditional Handover

Handovers are normally triggered when a UE experiences poor radio conditions. If the UE enters poor radio conditions quickly, the conditions may already be so poor that the actual handover procedure may be hard to execute. If the Uplink (UL) is already bad, it may lead to the network not being able to detect a Measurement Report transmitted by the UE, and hence, the network cannot initiate the handover procedure. Downlink (DL) problems may lead to a Handover Command not successfully reaching the UE. In poor radio conditions, the DL message may be more often segmented, which increases the risk of retransmissions, with an increased risk that the message does not reach the UE in time. Failed transmission of the Handover Command is a common reason for unsuccessful handovers.

In order to improve mobility robustness and to address the issues above, a concept known as conditional handover is currently being studied in 3GPP. The key idea in conditional handover may be understood to be that transmission and execution of the Handover Command are separated. This allows the Handover Command to be sent to the UE when the radio conditions are still good, thus increasing the likelihood that the message is successfully transferred. The execution of the Handover Command may be done at a later point in time based on an associated triggering condition. The triggering condition may typically be in the form of a threshold, such as e.g., when the target cell becomes X dB stronger than the serving cell.

The threshold used in the preceding measurement reporting event may need to be chosen lower than the one in the handover execution condition. This may be understood to allow the serving cell to prepare the handover upon reception of an early measurement report, and to provide the Handover Command when the radio link to the UE may still be stable. The execution of the handover may be done at a later point in time and/or threshold which may be considered more suitable for the handover execution.

The signaling flow for the conditional handover is shown in an example in FIG. 1. As shown in FIG. 1, a UE may send a measurement report to a source Radio Access Node (RAN) based on the lower threshold mentioned earlier. The source RAN node makes a decision based on the early measurement report and sends a handover (HO) request, accordingly, to a target RAN node. The target RAN node replies with a HO request acknowledgement which includes a HO Command. The Source RAN node then sends a Conditional HO Command to the UE. Here, the Conditional Handover Command may be understood to be a new message that may contain both the Handover Command and the associated triggering condition. The handover command may comprise the configuration for the target cell, and may be generated by the target node, in a same way as the handover command in the legacy handover. After some time passes, a measurement by the UE may fulfill the HO condition set in the Conditional HO Command, which causes the UE to execute the HO command. The UE and the target RAN node then perform synchronization and random access, after which the UE may send a HO complete message to the target RAN node. This causes the target RAN node to send a path switch request to a Non Access Stratum (NAS) node, and to receive a path switch request acknowledgement from the NAS node. Upon receipt of this acknowledgement, the target RAN node may then release the resources from the source RAN node.

Handling of Multiple Configurations

FIG. 1 shows an example of one serving cell and one target cell. In practice, the RAN may configure conditional handover for several cells with different associated triggering conditions. In principle there may be understood to be two ways to achieve this: 1) The network may send a single conditional handover command which may contain the handover command and associated triggering condition for each of the candidate target cells; and 2) The network may send multiple conditional handover commands, each containing a handover command and associated triggering condition for one target candidate cell.

Use of Delta Configuration

One problem in legacy handover is that the handover command may become quite large. This increases the risk of a handover failure as a large message may need to be segmented and/or sent with less robust coding. For conditional handover this may be understood to be less of a problem as the handover command may be sent earlier, when the radio conditions are still good. On the other hand, for conditional handover, the network may have to transmit several handover commands, and although the risk of transmission failure may be lower for each individual handover command, the overall transmission failure may be on a similar level. Thus, it is beneficial to reduce the size of the handover command also for conditional handover.

The size of the handover command may be reduced by means of a so-called delta configuration. Instead of signaling the full configuration only the delta to the current configuration may be signaled. Since large parts of the configuration may typically remain the same after a handover, such as e.g. a Radio Access Channel (RACH) configuration and/or a bearer configuration, the delta configuration may significantly reduce the size of the handover command.

Issues and Existing Solutions Related to Delta Configurations

It may happen that other reconfigurations are made after the UE has been configured with conditional handover, but before any handover has taken place. This may cause a configuration mismatch between the UE and the target node. This is due to the fact that when the handover is executed, the UE applies the delta configuration in the handover command to its current configuration, which may be understood to include the recent reconfiguration, while the target node assumes the delta configuration is applied to the configuration the UE had when the handover command was prepared. This mismatch may in turn lead to a failure of the handover or other connection errors.

One possible solution to this problem may be to rely on a full configuration instead of the delta configuration. However, as this increases the size of the handover command, this may not be a desirable solution. Another solution may be to inform the target node of the reconfiguration so that it may update its internal state or to cancel the conditional handover and issue a new one. However, both of these solutions cause additional signaling and complexity. Hence, a new solution to handle the configuration mismatch problem is needed.

SUMMARY

It is an object of embodiments herein to improve the handling of reconfigurations of a UE, during a conditional handover in a communications network.

According to a first aspect of embodiments herein, the object is achieved by a method performed by a target node in a communications network. The method is for handling reconfigurations of a UE during a conditional handover. The target node has received a conditional handover request for the UE from a source node. The target node also has sent a handover request acknowledgement to the source node based on a current configuration of the UE. The target node performs synchronization and random access with the UE based on the UE configuration used for the handover request acknowledgement. The target node also obtains, after performing the synchronization, information regarding an updated configuration of the UE. The updated configuration has taken place since the handover request acknowledgement was sent to the source node. At least one of the following may apply: i) the information is obtained from the UE in a handover complete message, and ii) the information is obtained from the source node at the time of the handover execution.

According to a second aspect of embodiments herein, the object is achieved by a method performed by the UE in the communications network. The method is for handling reconfigurations of the UE during the conditional handover. The UE receives, from the source node, a conditional handover message, comprising a handover command prepared by the target node based on the current configuration of the UE and a condition for triggering a handover. The UE receives, from the source node and after having received the conditional handover message, a reconfiguration message. When the condition for triggering the handover is met, the UE performs a handover from the source node to the target node. When accessing the target node after having received the reconfiguration message from the source node, the UE indicates, to the target node, in the handover complete message, at least one of: i) the indication that the configuration of the UE has been updated since the handover command was received by the UE, and ii) the information regarding the updated configuration of the UE.

According to a third aspect of embodiments herein, the object is achieved by a method performed by the source node in a communications network. The method is for handling reconfigurations of the UE during the conditional handover. The source node has sent the conditional handover request for the UE to the target node and has received the handover request acknowledgement from the target node based on the current configuration of the UE. The source node sends, to the UE, the conditional handover message, comprising the handover command prepared by the target node based on the current configuration of the UE and the condition for triggering the handover. The source node also performs a reconfiguration of the UE after having sent the conditional handover message. The source node also sends, to the target node, at the time of the handover execution, the information regarding the updated configuration of the UE.

According to a fourth aspect of embodiments herein, the object is achieved by the target node, configured to operate in the communications network. The target node is for handling reconfigurations of the UE during the conditional handover. The target node is configured to have received the conditional handover request for the UE from the source node and is configured to have sent the handover request acknowledgement to the source node based on the current configuration of the UE. The target node performs synchronization and random access with the UE based on the UE configuration configured to be used for the handover request acknowledgement. The target node is further configured to obtain, after performing the synchronization, the information regarding the updated configuration of the UE. The updated configuration is configured to have taken place since the handover request acknowledgement was sent to the source node. At least one of applies: i) the information is configured to be obtained from the UE in the handover complete message, and ii) the information is configured to be obtained from the source node at the time of the handover execution.

According to a fifth aspect of embodiments herein, the object is achieved by the UE configured to operate in the communications network. The UE is for handling reconfigurations of the UE during a conditional handover. The UE is configured to receive, from the source node, the conditional handover message, comprising the handover command prepared by the target node based on the current configuration of the UE and the condition for triggering the handover. The UE is further configured to receive, from the source node and after having received the conditional handover message, the reconfiguration message. The UE is also configured to perform, when the condition for triggering the handover is met, the handover from the source node to the target node. The UE is also configured to, when accessing the target node, after having received the reconfiguration message from the source node, indicate, to the target node, in the handover complete message, at least one of: i) the indication that the configuration of the UE has been updated since the handover command was received by the UE, and ii) the information regarding the updated configuration of the UE.

According to a sixth aspect of embodiments herein, the object is achieved by the source node, configured to operate in the communications network. The source node is for handling reconfigurations of the UE, during the conditional handover. The source node is configured to have sent the conditional handover request for the UE to the target node and to have received the handover request acknowledgement from the target node based on the current configuration of the UE. The source node is configured to send, to the UE, the conditional handover message, comprising the handover command prepared by the target node based on the current configuration of the UE and the condition for triggering the handover. The source node is also configured to perform the reconfiguration of the UE after having sent the conditional handover message. The second node is further configured to send, to the target node, at the time of the handover execution, the information regarding the updated configuration of the UE.

By the source node, or the UE, sending the information regarding the updated configuration of the UE to the target node at the time of the handover execution or in a handover complete message, respectively, and not right after the reconfiguration, RRC and network signalling are advantageously substantially reduced. This may be understood to be due to the fact that since in conditional handover, the conditions may change between reception and execution of the handover, such as change in load due to mobility, radio conditions, etc., the number of possible target nodes may change between the moment of reconfiguration of the UE, and the actual execution of the handover. By sending the information regarding the updated configuration of the UE to the target node only at the time of the handover execution or in a handover complete message, and not earlier, the update of the reconfiguration does not need to be made to all the candidate target nodes, but to only those, or that, which may be relevant at the time of execution of the handover. Hence, the source node and the UE may avoid having to notify all the possible target nodes about the reconfiguration, and thereby reduction of RRC and network signalling is enabled to be substantially reduced.

BRIEF DESCRIPTION OF THE DRAWINGS

Examples of embodiments herein are described in more detail with reference to attached drawings in which:

FIG. 17 is a flowchart depicting methods implemented in a communication system including a host computer, a base station and a user equipment in accordance with some embodiments;

FIG. 18 is a flowchart depicting methods implemented in a communication system including a host computer, a base station and a user equipment in accordance with some embodiments.

DETAILED DESCRIPTION

The embodiments disclosed herein provide a solution for handling reconfigurations of a UE occurring between the HO Command and the actual handover, without having to update the conditional handover configuration in the UE and in all possible target nodes.

Embodiments herein may be understood to be related to methods and devices for handling reconfigurations of a user equipment during a conditional handover. According to one embodiment herein, a UE may inform the network, such as a target node, that it has had its configuration updated after the conditional handover was configured. According to a further embodiment a source node, such as an eNB or a gNB, may inform a target node, such as an eNB or gNB, about the updated UE configuration at the time of the handover.

In some embodiments herein the general term "network node" is used and it may correspond to any type of radio network node or any network node, which communicates with at least a radio network node. Examples of network nodes are any radio network node stated above; a core network node, such as e.g. a Mobile Switching Centre (MSC), a Mobility Management Entity (MME), an Operations & Management (O&M) node, an Operation, Administration and Maintenance (OAM) node, an Operations Support Systems (OSS) node, a Self-Organizing Network (SON) node, a positioning node, such as e.g. an Enhanced Serving Mobile Location Centre (E-SMLC), or a function related Minimization of Drive Tests (MDT) etc.

In some embodiments, the non-limiting term network device is used and it may be understood to refer to any type of wireless device communicating with a network node in a cellular or mobile communication system and being able to perform measurements on other network nodes in a surrounding or tracking area of the network device. Examples of a network device are UE, mobile terminal, target device, device to device UE, machine type UE or UE capable of machine to machine communication, PDA, iPad, Tablet, mobile terminals, smart phone, Laptop Embedded Equipment (LEE), Laptop Mounted Equipment (LME), USB dongles, radio network node, radio access node etc.

Figure 1:
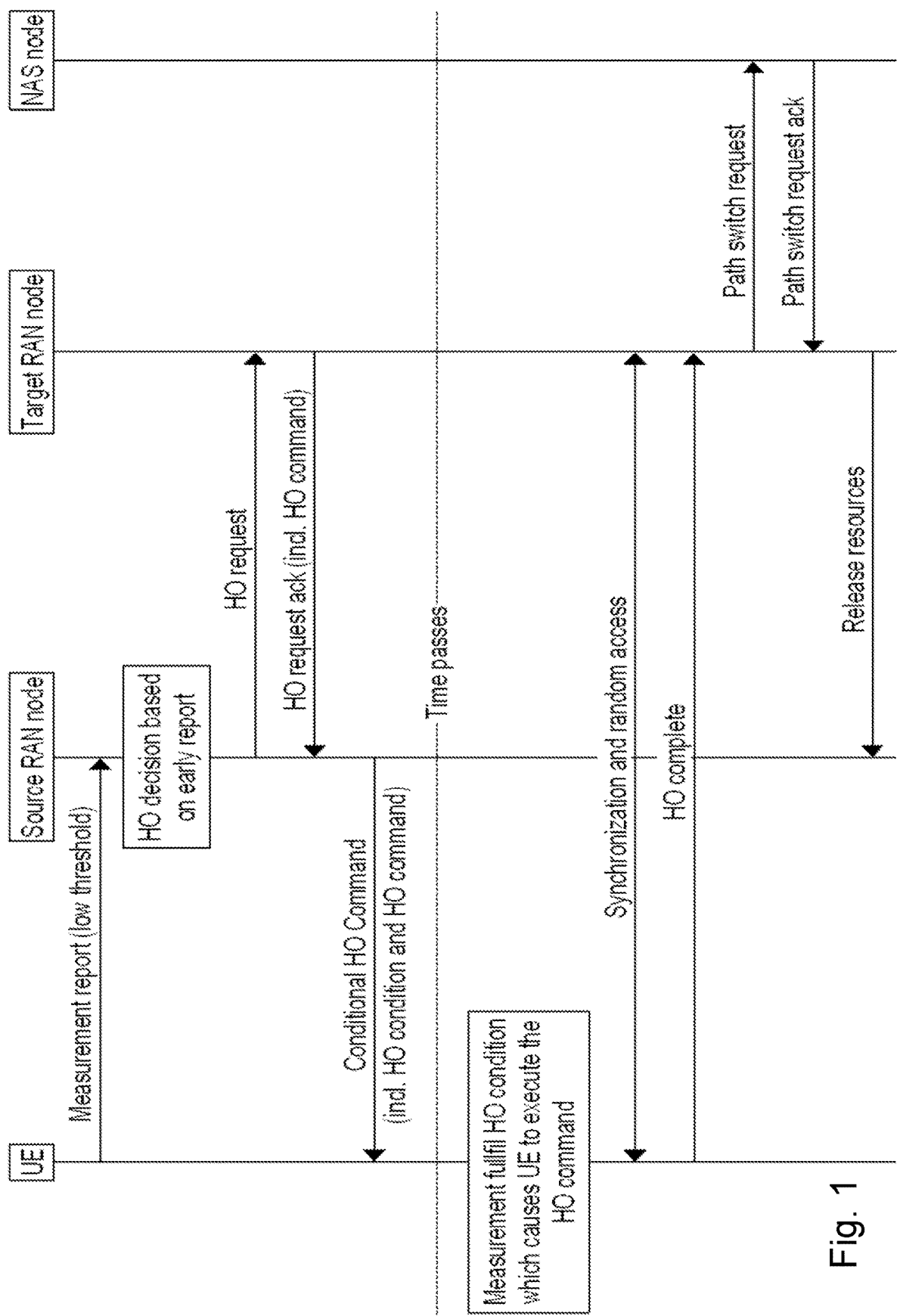
FIG. 1 is a signaling diagram illustrating a conditional handover in a wireless communications network.
Figure 2:
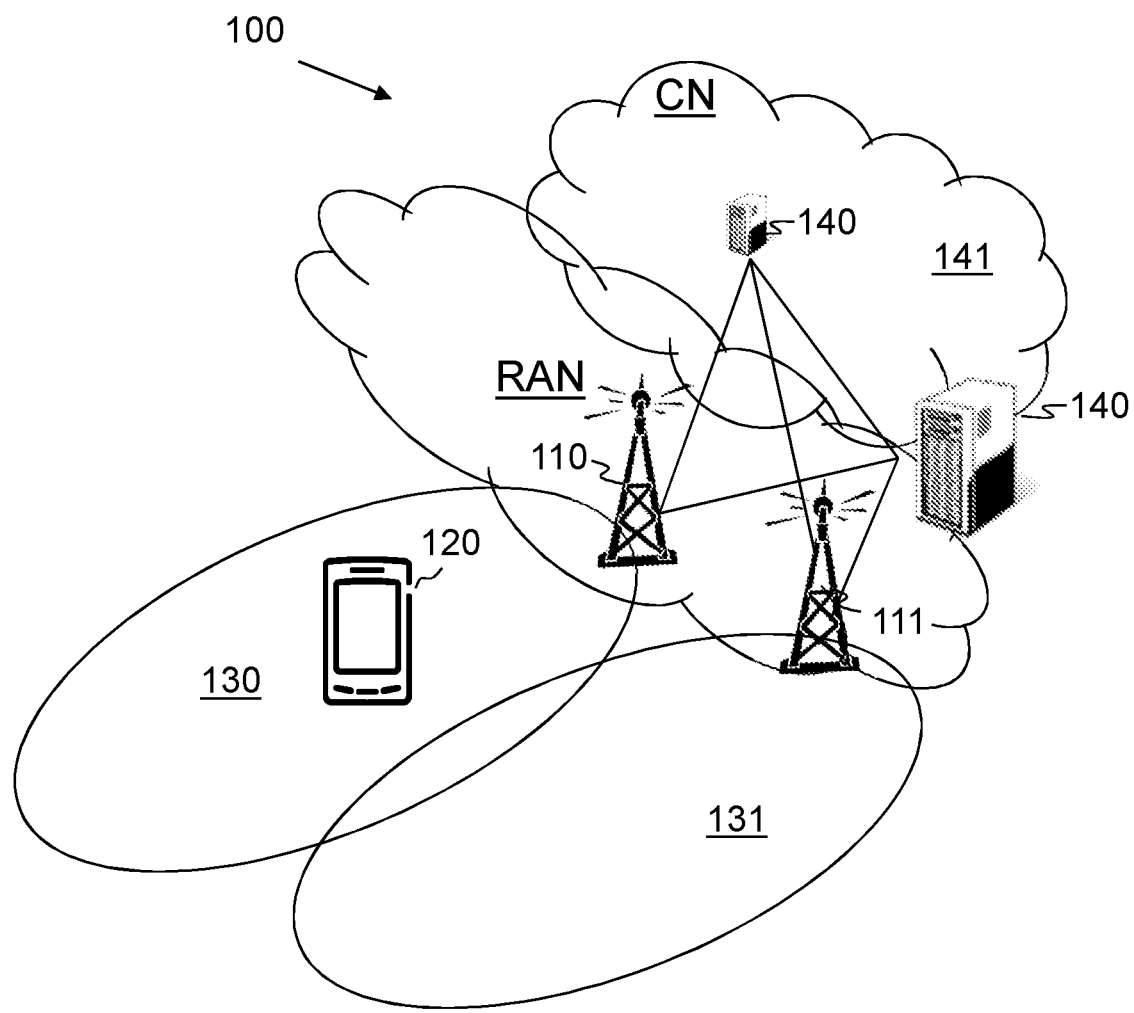
FIG. 2 is a schematic block diagram illustrating embodiments of a wireless communications network according to the embodiments herein.

FIG. 2 depicts an example of a communications network 100 according to a first scenario in which embodiments herein may be implemented. The communications network 100 is a wireless communication network such as e.g. an LTE, E-Utran, Wideband Code Division Multiple Access (WCDMA), Global System for Mobile communications (GSM) network, any 3rd Generation Partnership Project (3GPP) cellular network, Worldwide Interoperability for Microwave Access (Wimax), or any cellular network or system.

The communications network 100 comprises a Radio Access Network (RAN) and a Core Network (CN). The communication network 100 may use a number of different technologies, such as Long Term Evolution (LTE), LTE-Advanced, 5G, WCDMA, Global System for Mobile communications/Enhanced Data rate for GSM Evolution (GSM/EDGE), Worldwide Interoperability for Microwave Access (VViMax), Wi-Fi, or Ultra Mobile Broadband (UMB), just to mention a few possible implementations. In the communication network 100, one or more UEs 120 may communicate via one or more Access Networks (AN), e.g. RAN, to one or more CNs. The UE 120 may e.g. be a wireless device (WD), a mobile station, a non-access point (non-AP) STA, a STA, and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The RAN comprises a set of radio network nodes, such as radio network nodes 110, 111 each providing radio coverage over one or more geographical areas, such as a cell 130, 131 of a radio access technology (RAT), such as 5G, LTE, Universal Mobile Telecommunications System (UMTS), Wi-Fi or similar. Any of the radio network nodes 110, 111 may be a radio access network node such as radio network controller or an access point such as a wireless local area network (WLAN) access point or an Access Point Station (AP STA), an access controller, a base station, e.g., a radio base station such as a gNB, a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the first radio access technology and terminology used.

The CN further comprises a core network node 140 which is configured to communicate with the radio network nodes 110, 111, via e.g. an S1 interface. The core network node may e.g., be a Mobile Switching Centre (MSC), a Mobility Management Entity (MME), an Operations & Management (O&M) node, an Operation, Administration and Maintenance (OAM) node, an Operations Support Systems (OSS) node and/or a Self-Organizing Network (SON) node. The core network node 140 may further be a distributed node comprised in a cloud 141.

The UE 120 is located in the cell 130 of one of the radio network nodes 110, or a first network node, which may be referred to herein as the network node 110, which cell 130 is herein referred to as the serving cell, whereas the cells 131 of other radio network nodes 111, which may be referred to herein as the network nodes 111, are referred to as neighboring cells. The first network node 110 may, in the context of a handover, also be referred to as a source node, and one of the network nodes 111, or a second network node, may be referred to as a target node when the handover is performed from the first network node 110 to the second network node 111. Although, the first network node 110 in FIG. 2 is only depicted providing a serving cell 130, the first network node 110 may further provide one or more neighboring cells 131 to the serving cell 130.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network, such as 5G or any cellular network or system, may also benefit from exploiting the ideas covered within this disclosure.

In general, the usage of "first", "second", etc. herein may be understood to be an arbitrary way to denote different elements or entities, and may be understood to not confer a cumulative or chronological character to the nouns they modify.

Embodiments of method performed by the source node 110 will now be described with reference to the flowchart depicted in FIG. 3. The method is performed in the communications network 100. The method may be understood to be for handling reconfigurations of the UE 120 during a conditional handover. The source node 110 has sent a conditional handover request for the UE 120 to the target node 111, and has received a handover request acknowledgement from the target node 111 based on a current configuration of the UE 120.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

In the course of communications in the communications network 100, the UE 120 may perform measurements of one or more radio links, e.g., its link with the cell 130 of the source node 110. At some point, a measurement report by the UE 120 may be triggered when, e.g., a low threshold in the link with the cell 130 may be met, as may be configured in the UE 120. The UE 120 may then send the report to the source node 110. Based on the early measurement report, the source node 110 may decide to trigger a conditional handover (HO). The source node 110 may send a conditional HO request to the target node 111, which may include the current configuration of the UE 120. The target node 111 may respond with a HO request acknowledgement, which may comprise a HO command to be applied by the UE 120. The HO command may comprise a delta configuration CΔ which the target node 111 may have calculated based on the current configuration of the UE 120, or a full configuration C1. In an alternative example, the source node 110 may prepare the handover command instead of the target node 111.

The embodiments and examples herein assume that a single candidate target cell 111 may be configured in the conditional handover, but the embodiments herein may be understood to also work for multiple candidate target cells 111.

Action 301

In this Action 301, the source node 110 sends, to the UE 120, a conditional handover message. The conditional handover message comprises a handover command prepared by the target node 111 based on the current configuration of the UE 120 and a condition for triggering a handover. Since the handover is conditional, it may be understood that the handover may be triggered at a future time. The condition may also be referred to herein as a triggering condition.

In response to this, the UE 120 may compute a full configuration based on the delta configuration C$\Delta$ contained in the handover command and may store it in a memory. Alternatively, the UE 120 may store its current configuration and the delta configuration from the handover command. Alternatively, the UE 120 may store the full configuration if a full configuration is received.

Action 302

Due to changing conditions, or some other reason, the source node 110 may decide to re-configure the UE 120, that is, to update the current configuration of the UE 120. In this Action 302, the source node 110 performs a reconfiguration of the UE 120 after having sent 301 the conditional handover message.

The embodiments herein may provide more possibilities to handle reconfigurations occurring between the HO Command and the actual handover without having to submit new, full configurations to the UE 120.

In one example, a parameter C0 may be the UE's current configuration, that is the current configuration of the UE 120, at the time the conditional handover command is received, and C$\Delta$ may be the delta configuration conveyed to the UE 120 before the actual handover is performed. The full configuration C1 to apply when the handover is executed may then be:

$$C1 = Ca + C\Delta$$

Action 303

In this Action 303, the source node 110 may receive, from the target node 111, an indication to release the UE 120. That is, the target node 111 may indicate to the source node 110 to release its resources for the UE 120.

This Action 303 may be performed before performing Action 304, that is, before having sent, in Action 304, the information which will be described next, to the target node 111.

Action 304

According to one example, when the source node 110 performs a reconfiguration procedure towards the UE 120 after the conditional handover was configured but before the actual handover was executed, the possible target nodes may not be informed about the reconfiguration. The source node 110 may refrain from informing the target node 111 about the reconfiguration, after the reconfiguration is performed, between when the conditional handover is configured and before the handover is executed.

The source node 110, in this Action 304, sends, to the target node 111, at the time of the handover execution, information regarding the updated configuration of the UE 120.

By the source node 110 sending the information regarding the updated configuration of the UE 120 to the target node 111 at the time of the handover execution, and not right after the reconfiguration, RRC and network signalling are advantageously substantially reduced. This may be understood to be due to the fact that since in conditional handover, the conditions may change between reception and execution of the handover, such as change in load due to mobility, radio conditions, etc., the number of possible target nodes may change between the moment of reconfiguration of the UE 120, and the actual execution of the handover. By sending the information regarding the updated configuration of the UE 120 to the target node 111 only at the time of the handover execution, and not earlier, the update of the reconfiguration does not need to be made to all the candidate target nodes, but to only those, or that, which may be relevant at the time of execution of the handover. Hence, the source node 110 may avoid having to notify all the possible target nodes, and thereby enables to reduce RRC and network signalling substantially.

Embodiments of method performed by the target node 111 will now be described with reference to the flowchart depicted in FIG. 4. The method is performed in the communications network 100. The method may be understood to be for handling reconfigurations of the UE 120 during a conditional handover. The target node 111 has received a conditional handover request for a UE 120 from the source node 110 and has sent a handover request acknowledgement to the source node 110 based on a current configuration of the UE 120.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the UE 120, and will thus not be repeated here to simplify the description. For example, the parameter C0 may be the current configuration of the UE 120, at the time the conditional handover command is received, and C$\Delta$ may be the delta configuration conveyed to the UE 120 before the actual handover is performed. The full configuration C1 to apply when the handover is executed may be C1=C0+C$\Delta$.

Action 401

After having received the conditional handover message from the source node 110, the UE 120, may detect that the triggering condition for the conditional handover is met. The UE 120 may then synchronize and perform random access to the target cell 131. In this Action 401, the target node 111 performs synchronization and random access with the UE 120 based on the UE configuration used for the handover request acknowledgement, that is, the handover request acknowledgement it has sent a to the source node 110 based on the current configuration of the UE 120.

Action 402

In some embodiments, in this Action 402, the target node 111 may receive, from the UE 120, a handover complete message. The handover complete message may indicate that the handover has been successfully completed. The handover complete message may comprise an indication that the configuration of the UE 120 has been updated since the handover request acknowledgement was sent to the source node 110.

Action 403

In this Action 403, the target node 111 obtains, after performing 401 the synchronization, information regarding the updated configuration of the UE 120. The updated configuration has taken place since the handover request acknowledgement was sent to the source node 110. At least one of the following situations may apply: i) the information is obtained from the UE 120 in a handover complete message, e.g., the handover complete message as in Action 402, and ii) the information is obtained from the source node 110 at the time of the handover execution. The information obtained by the target node 111 in this Action 403 may be understood to indicate what has been changed in the updated configuration.

Action 403*a*

According to option ii), in some embodiments, the obtaining in this Action 403 may comprise receiving 403*a*, from the source node 110, the information about the updated configuration of the UE 120.

Example 1

According to one example, when the source node 110 performs a reconfiguration procedure towards the UE 120 after the conditional handover was configured but before the actual handover was executed, the possible target nodes may not be informed about the reconfiguration. Instead, the UE 120 may indicate to the target node 111 when accessing the target that it has had its configuration updated since the conditional handover was configured. This indication may be received in Action 402 described earlier. The target node 111 may then fetch the latest configuration from the source node 110 in this Action 403*a*.

Example 2

In yet another example herein, when the source node 111 performs a reconfiguration procedure towards the UE 120 after the conditional handover was configured but before the actual handover was executed, the possible target nodes may not be informed about the reconfiguration. Instead the source node 110 may inform, according to this Action 403*a*, the target node 111 about the changed configuration when it is informed by the target node 111 that the UE 120 has moved to that target node 111.

Action 403*b*

According to option i), in some embodiments, the obtaining in this Action 403 may comprise receiving 403*b*, from the UE 110, the information about the updated configuration of the UE 120.

The information about the updated configuration of the UE 120, may comprise a complete configuration of the UE 120 and/or the changes in relation to the previous configuration of the UE 120, e.g., a delta with respect to the previous, not yet updated, configuration.

The target node 111 may not be informed by the UE 120 or the source node 110 about the reconfiguration after the reconfiguration, between when the conditional handover may be configured and before the handover may be executed. This may be understood to be because the UE 120 and/or the source node 110 may refrain from informing the target node 111 about the reconfiguration after the reconfiguration may have been performed, between when the conditional handover may have been configured and before the handover may have been executed.

Example 3

According to another example, when the source node 110 performs a reconfiguration procedure towards the UE 120 after the conditional handover was configured but before the actual handover was executed, the possible target nodes 111 may not be informed about the reconfiguration. Instead the UE 120 may inform the target node 111 about what was changed in the configuration since the conditional handover was configured, which the target node 111 may obtain in this Action 403*b*.

Action 404

The target node 111, in this Action 404, may update, based on the information regarding the updated configuration of the UE 120, a context of the UE 120.

Action 405

The UE 120 may be reconfigured to the configuration that may be decided by the target node 111. In this Action 405, the target node 111 may determine, based on the information regarding the updated configuration of the UE 120, to change parts of and/or a complete configuration of the UE 120.

Determining may be understood as e.g., calculating.

Action 406

The target node 111, in this Action 406, may perform a reconfiguration of the UE 120 based on the determined changes in Action 405.

Embodiments of a method performed by the UE 120, will now be described with reference to the flowchart depicted in FIG. 5. The method may be understood to be for handling reconfigurations of the UE 120 during the conditional handover. The method is performed in the communications network 10.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 5, optional actions are indicated with dashed boxes.

The detailed description of some of the following corresponds to the same references provided above, in relation to the actions described for the UE 120, and will thus not be repeated here to simplify the description. For example, the parameter C0 may be the current configuration of the UE 120, at the time the conditional handover command is received, and CΔ may be the delta configuration conveyed to the UE 120 before the actual handover is performed. The full configuration C1 to apply when the handover is executed may be C1=C0+CΔ.

Action 501

In this Action 501, the UE 120 receives, from the source node 110, the conditional handover message, comprising the handover command prepared by the target node 111 based on the current configuration of the UE 120 and the condition for triggering the handover.

Action 502

The UE 120, in this Action 502, receives, from the source node 110 and after having received the conditional handover message, the reconfiguration message.

Action 503

When the condition for triggering the handover is met, the UE 120, in this Action 503, performs a handover from the source node 110 to the target node 111.

Action 504

The UE 120 may refrain from informing the target node 111 about the reconfiguration after the reconfiguration is performed, between when the conditional handover is configured and before the handover is executed.

According to one example, such as the Example 1 described herein, when the source node 110 performs a reconfiguration procedure towards the UE 120 after the conditional handover was configured but before the actual handover was executed, the possible target nodes may not be informed about the reconfiguration. Instead, the UE 120 may indicate to the target node 111 when accessing the target that it has had its configuration updated since the conditional handover was configured.

According to another example, such as the Example 2 described herein, when the source node 110 performs a reconfiguration procedure towards the UE 120 after the conditional handover was configured but before the actual handover was executed, the possible target nodes 111 may not be informed about the reconfiguration. Instead the UE 120 may inform the target node 111 about what was changed in the configuration since the conditional handover was configured Accordingly, when accessing the target node 111 after having received, in Action 502, the reconfiguration message from the source node 110, the UE 120 in this Action 504, indicates, to the target node 111, in the handover complete message, at least one of: i) the indication that the configuration of the UE 120 has been updated since the handover command was received by the UE 120, and ii) the information regarding the updated configuration of the UE 120.

By the UE 120 indicating the information regarding the updated configuration of the UE 120 to the target node 111 in the handover complete message, and not right after the reconfiguration, RRC and network signalling are advantageously substantially reduced. This may be understood to be due to the fact that since in conditional handover, the conditions may change between reception and execution of the handover, such as change in load due to mobility, radio conditions, etc., the number of possible target nodes may change between the moment of reconfiguration of the UE 120, and the actual execution of the handover. By sending the information regarding the updated configuration of the UE 120 to the target node 111 only at in the handover complete message, and not earlier, the update of the reconfiguration does not need to be made to all the candidate target nodes, but to only those, or that, which may be relevant at the time of execution of the handover. Hence, the UE 120 may avoid having to notify all the possible target nodes about the reconfiguration, and thereby enables to reduce RRC and network signalling substantially.

Action 505

In this Action 505, the UE 120 may receive, from the target node 111, after having indicated in Action 504 the at least one of the indication and the information, the reconfiguration message comprising a partial or a complete update of the configuration of the UE 120 based on the updated configuration of the UE 120.

This is an optional action.

In the following section, the embodiments herein will be illustrated in more detail by a number of exemplary embodiments and examples. It should be noted that these embodiments and examples are not mutually exclusive. Components from one embodiment or example may be tacitly assumed to be present in another embodiment or example and it will be obvious to a person skilled in the art how those components may be used in the other exemplary embodiments.

Example 1

According to one example, when the source node 110 performs a reconfiguration procedure towards the UE 120 after the conditional handover was configured but before the actual handover was executed, the possible target nodes may not be informed about the reconfiguration. Instead, the UE 120 may indicate to the target node 111 when accessing the target that it has had its configuration updated since the conditional handover was configured. This indication may be received in Action 402 described earlier. The target node 111 may then fetch the latest configuration from the source node 110 in Action 403*a*, update the UE 120 context, and may send an additional handover command message, such as a RRCConnectionReconfiguration message or a RRCReconfiguration message including reconfigurationWithSync, to the UE 120. A handover command procedure, such as e.g. a RRCConnectionReconfiguration or a or a RRCReconfiguration procedure, is often performed after the handover anyhow to update measurements, and the reconfiguration of the UE 120 may be performed in the same or a RRCReconfiguration procedure. Optionally, the target node 111 may omit the handover command to the UE 120 if the target node 111 accepts the entire reconfiguration retrieved from the source node 110. With this option, the UE 120 may know that it may continue to use the latest (re)configuration it received from the source node 110 until it possibly receives a handover command message from the target node 111.

Example 2

In yet another example herein, when the source node 111 performs a reconfiguration procedure towards the UE 120 after the conditional handover was configured but before the actual handover was executed, the possible target nodes may not be informed about the reconfiguration. Instead the source node 110 may inform, according to Action 403*a*, the target node 111 about the changed configuration when it is informed by the target node 111 that the UE 120 has moved to that target node 111. The source node 110 may then send the UE 120 context to the target node 111 and the target node 111 may send an additional handover command message to the UE 120.

Example 3

According to another example, when the source node 110 performs a reconfiguration procedure towards the UE 120 after the conditional handover was configured but before the actual handover was executed, the possible target nodes 111 may not be informed about the reconfiguration. Instead the UE 120 may inform the target node 111 about what was changed in the configuration since the conditional handover was configured, which the target node 111 may obtain in this Action 403*b*. The target node 111 may then decide which parts of the configuration that may be continued in the target node 111 and may possibly send an additional handover command message to the UE 120. If the UE 120 does not receive any additional reconfiguration message, it may continue using the existing configuration.

Figure 6:
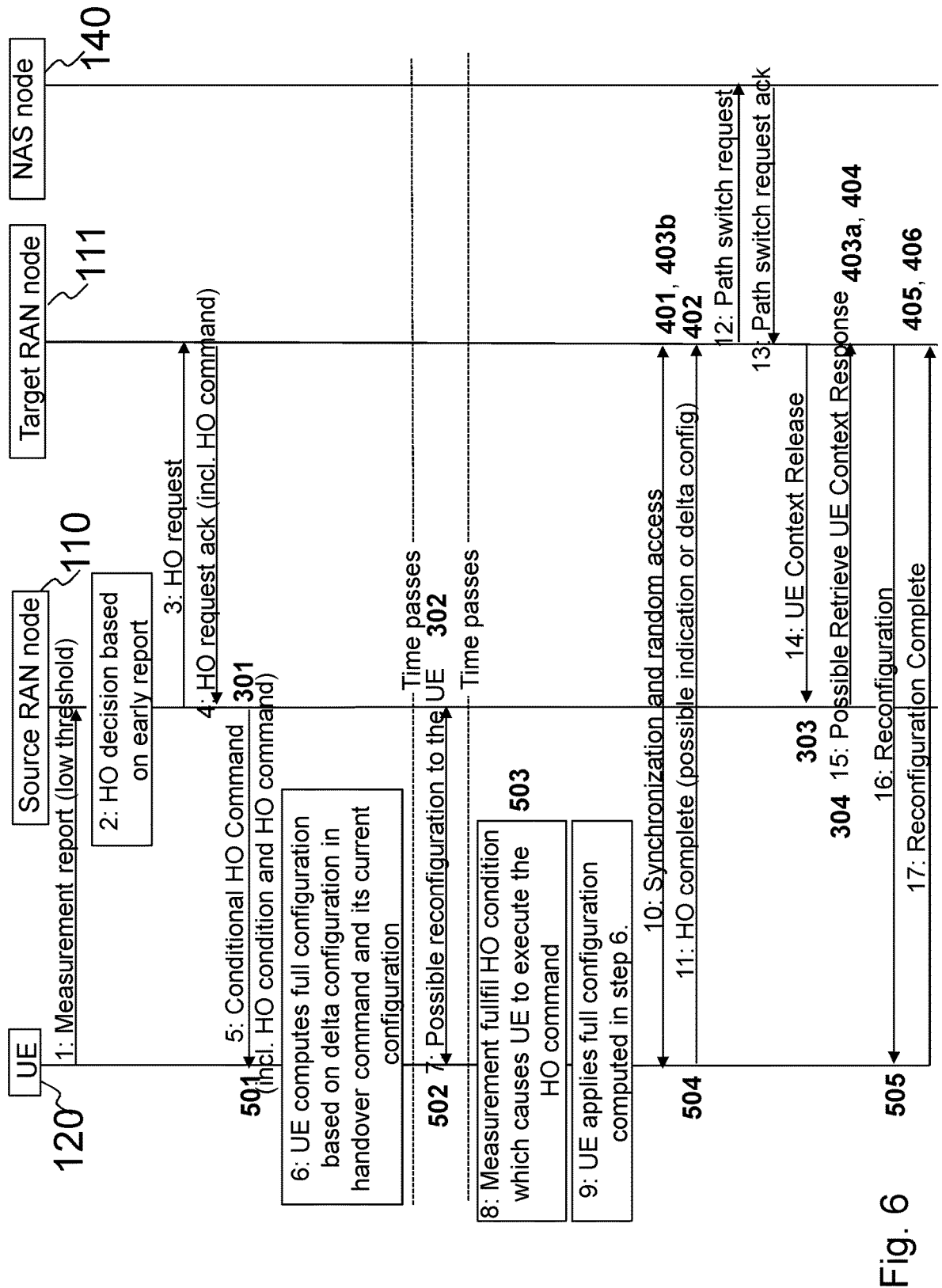
FIG. 6 is a signaling diagram illustrating a conditional handover in a wireless communications network according to the embodiments herein.

FIG. 6 discloses a non-limiting example of method actions according to some of the embodiments herein as performed in the communications network 100:

Action 1: A measurement report may be triggered when the low threshold is met. The UE 120 performs the measurement and sends the report to the source node 110.

Action 2: Based on the early measurement report, the source node 110 may decide to trigger a conditional handover.

Action 3: The source node 110 may send a conditional HO request to the target node 111 which includes the UE 120's current configuration.

Action 4: The target node 111 may respond with a HO request acknowledgement which comprises a HO command to be applied by the UE 120. The HO command may comprise a delta configuration CΔ which the target node 111 has calculated based on the UE 120's current configuration, or a full configuration C1.

Action 5: The source node 110 may, according to Action 301, send a conditional handover message to the UE 120, which receives it according to Action 501. The conditional handover message comprises the handover command prepared by the target RAN node 111 and a triggering condition for triggering a handover.

Action 6: The UE 120 may compute a full configuration based on the delta configuration CΔ contained in the handover command and may store it in a memory. Alternatively, the UE 120 may store its current configuration and the delta configuration from the handover command. Alternatively, the UE 120 may store the full configuration if a full configuration is received.

Action 7: Due to changing conditions or some other reason, the source node 110 may decide to re-configure the UE 120, according to Action 302. The UE 120 receives the reconfiguration message according to Action 502.

Action 8: At some later point the UE 120 may detect that the triggering condition for the conditional handover is met. The UE 120 may then perform the handover from the source node 110 to the target node 111, according to Action 503.

Action 9: When the handover is executed, the UE 120 may apply the configuration from action 6.

Action 10: The UE 120 may synchronize and perform random access to the target cell 111, according to Action 401.

Action 11: The UE 120 may send, according to Action 504, a handover complete message to the target node 111 to indicate that the handover has been successfully completed. The target node 111 may receive the handover complete message from the UE 120 in agreement with Action 402. The handover complete message may comprise, according to Action 403b, an indication that the configuration in the UE 120 has been updated since step 6. Alternatively, the handover complete message may comprise information about what configuration has been updated since step, or Action, 6.

Action 12: The target node 111 may trigger a path switch procedure to request the CN to change a User Plane (UP) path from the source node 110 to the target node 111.

Action 13: The path switch is performed.

Action 14: The target node 111 may indicate to the source node 110 to release its resources for the UE 120, which the source node 110 may receive in agreement with Action 303. It may be noted that the steps/messages 14-17 may also be performed before and/or in parallel with the path switch procedure, that is, before or in parallel with steps/messages 12 and 13.

Action 15: The source node 110 informs, according to Action 304, the target node 111 about the new UE context, which the target node 111 may receive in agreement with Action 403a. The target node 111 may then update the context of the UE 120 in agreement with Action 404. This may possibly be sent at an earlier stage. It may be noted that the actions 14-17 may also be performed before and/or in parallel with the path switch procedure, that is, before or in parallel with actions 12 and 13.

Action 16: The UE 120 may be reconfigured to the configuration that is decided by the target node 111, in agreement with Action 405 and 406. Note that actions 14-17 may also be performed before and/or in parallel with the path switch procedure, that is, before or in parallel with actions 12 and 13.

17. The reconfiguration is complete. It may be noted that actions 14-17 may also be performed before and/or in parallel with the path switch procedure, that is, before or in parallel with actions 12 and 13.

The example above assumes that a single candidate target cell 111 is configured in the conditional handover, but the solution may be understood to also work for multiple candidate target cells 111.

In an alternative solution, the source node 110 may prepare the handover command instead of the target node 111.

As a general summarized overview of the foregoing, embodiments herein may be understood to be related to methods and devices for handling reconfigurations of a user equipment during a conditional handover. In particular, the embodiments herein may provide a method for informing a target node that there has been a reconfiguration of the UE after the conditional handover was configured, but before the actual handover was performed. The method may comprise the UE informing the target node about the reconfiguration, and/or the source node informing the target node about the reconfiguration.

The embodiments herein have the advantage that the source node can reconfigure the UE after the conditional handover is configured but before the handover is executed. Being able to reconfigure the UE may be understood to be important in case of conditional handover since the time between the reception and execution of the handover command may be relatively long compared to legacy handover. Hence, the environment and conditions may change which may require a reconfiguration of the UE.

Being able to reconfigure the UE without updating the conditional handover configuration in the UE and all possible target nodes reduces both Radio Resource Control (RRC) and network signaling substantially.

Figure 7:
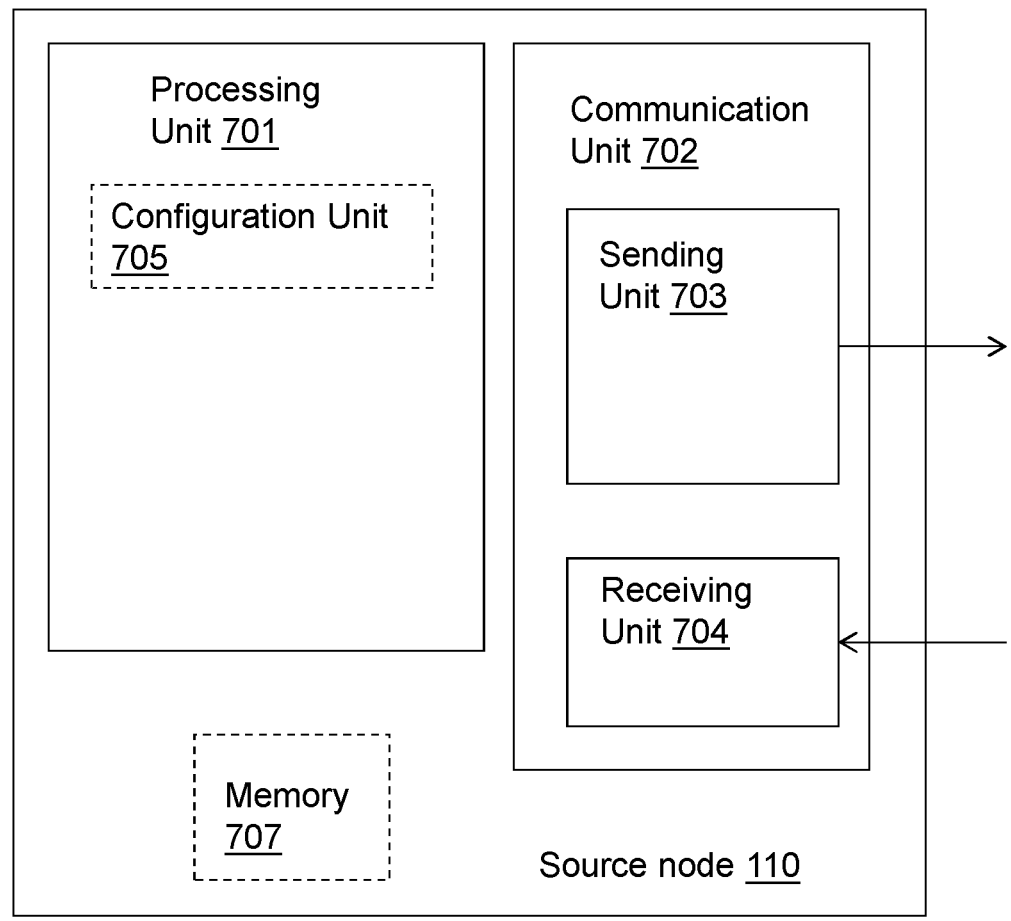
FIG. 7 is a schematic block diagram illustrating a source node according to some embodiments herein.
Figure 7:
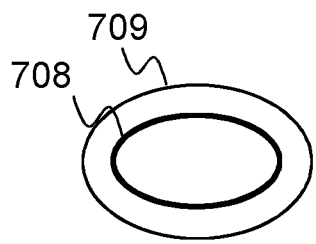

To perform the method actions for handling reconfigurations of the UE 120 during the conditional handover, described above in relation to FIG. 3, the source node 110 may comprise the following arrangement as depicted in FIG. 7. The source node 110 is in the communications network 100.

The source node 110 may comprise a processing unit 701 and a communication unit 702 for communicating with network devices, such as other network nodes 110, 111, 140 or UEs, such as the UE 120. The communication unit 702 may comprise a sending unit 703 and a receiving unit 704. The source node 110 may further comprise a configuration unit 705.

The source node 110 is configured to have sent a conditional handover request for the UE 120 to the target node 111 and has received a handover request acknowledgement from the target node 111 based on the current configuration of the UE 120.

The source node 110 may be configured to, e.g. by means of the communication unit 702 and/or the sending unit 703 and/or the processing unit 701 being configured to, send, to the UE 120, the conditional handover message, comprising the handover command prepared by the target node 111 based on the current configuration of the UE 120 and the condition for triggering the handover.

The source node 110 may further be configured to, e.g. by means of the configuring unit 705 and/or the processing unit 701 being configured to, perform a reconfiguration of the UE 120. In embodiments herein, the source node 110 is configured to, e.g. by means of the configuring unit 705 and/or the processing unit 701 being configured to, perform the reconfiguration of the UE 120 after having sent 301 the conditional handover message.

The source node 110 may further be configured to, e.g. by means of the communication unit 702 and/or the sending unit 703 and/or the processing unit 701 being configured to, send information regarding the updated configuration of the UE 120 to the target node 111. In embodiments herein, the source node 110 is configured to, e.g. by means of the communication unit 702 and/or the sending unit 703 and/or the processing unit 701 being configured to, send, to the target node 111, at the time of the handover execution, the information regarding the updated configuration of the UE 120.

In some embodiments, the source node 110 may be further configured to refrain from informing the target node 111 about the reconfiguration after the reconfiguration may be performed, between when the conditional handover may be configured and before the handover may be executed.

The source node 110 may further be configured to, e.g. by means of the receiving unit 704 and/or the processing unit 701 being configured to, receive an indication to release the UE 120 from the target node 111. In embodiments herein, the source node 110 is configured to, e.g. by means of the receiving unit 704 and/or the processing unit 701 being configured to, receive, from the target node 111 after having sent the information to the target node 111, the indication to release the UE 120.

Those skilled in the art will also appreciate that the configuration unit 705 described above may refer to a combination of analog and digital circuits, and/or one or more processors configured with software and/or firmware, e.g. stored in the memory 707, that when executed by the one or more processors such as the processing unit 701, perform as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The configuration unit 705 may be a processor of the source node 110, such as the processing unit 701, or an application running on such processor.

Figure 3:
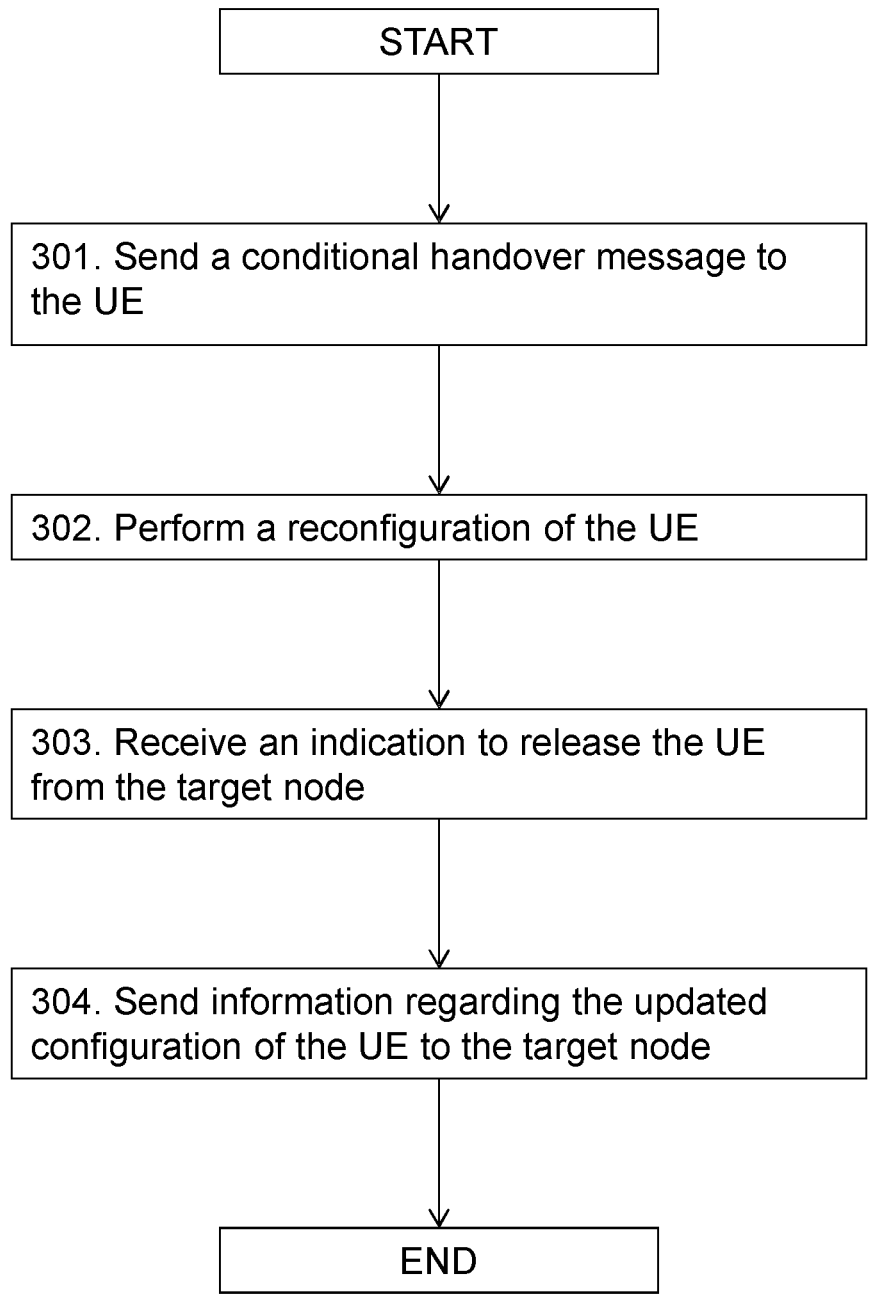
FIG. 3 is a flow chart illustrating embodiments of a method performed by a source node.
Figure 8:
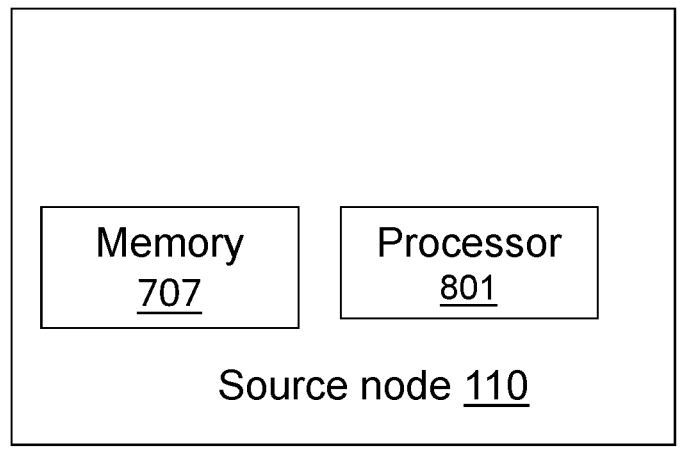
FIG. 8 is a schematic block diagram illustrating the source node according to some further embodiments herein.
Figure 8:
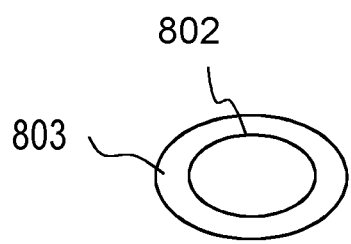

The embodiments herein for handling reconfigurations of the UE 120 during a conditional handover may be implemented through a respective processor or one or more processors of a processing circuitry 801 in the source node 110 as depicted in FIG. 8, which processing circuitry 801 is configured to perform the method actions according to FIG. 3 and the embodiments described above for the source node 110.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the source node 110. One such carrier may be in the form of a CD ROM disc. It is however feasible with other data carriers such as e.g. a memory stick. The computer program code may furthermore be provided as pure program code on a server and downloaded to the source node 110.

The source node 110 may further comprise the memory 707. The memory 707 may comprise one or more memory units to be used to store data on, such as the UE configurations, software, patches, system information (SI), configurations, diagnostic data, performance data and/or applications to perform the methods disclosed herein when being executed, and similar.

The method according to the embodiments described herein for the source node 110 may be implemented by means of e.g., a computer program product 708, 802 or a computer program, comprising instructions, i.e., software code portions, which, when executed on at least one processor, cause at least one processor to carry out the actions described herein, as performed by the source node 110. The computer program product 708, 802 may be stored on a computer-readable storage medium 709, 803, e.g. a disc or similar. The computer-readable storage medium 709, 803, having stored thereon the computer program, may comprise instructions which, when executed on at least one processor, cause the at least one processor to carry out the actions described herein, as performed by the source node 110. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the source node.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

Figure 9:
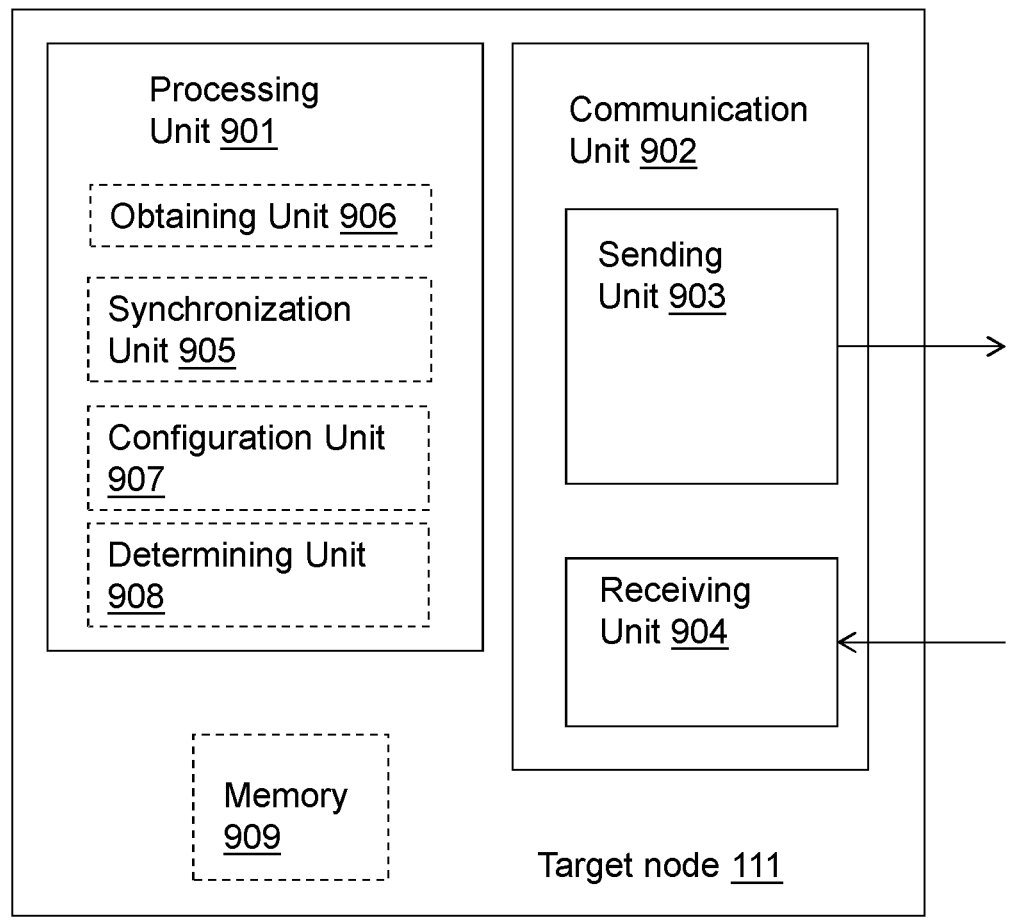
FIG. 9 is a schematic block diagram illustrating a target node according to some embodiments herein.
Figure 9:
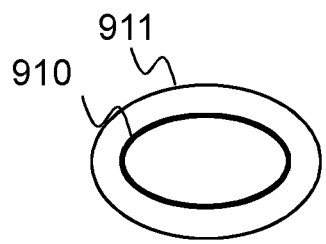

To perform the method actions for handling reconfigurations of the UE 120 during the conditional handover, described above in relation to FIG. 5, the target node 111 may comprise the following arrangement as depicted in FIG. 9. The target node 111 is configured to operate in the communications network 100.

The target node 111 may comprise a processing unit 901 and a communication unit 902 for communicating with network devices, such as other network nodes 110, 111, 140 or UEs 120. The communication unit 902 may comprise a sending unit 903 and a receiving unit 904. The target node 111 may further comprise a synchronization unit 905, an obtaining unit 906, a configuration unit 907 and/or a determining unit 908.

The target node 111 is configured to have received a conditional handover request for the UE 120 from the source node 110 and is configured to have sent a handover request acknowledgement to the source node 110 based on the current configuration of the UE 120.

The target node 111 may be configured to, e.g. by means of the communication unit 902 and/or the sending unit 903 and/or receiving unit 904 and/or the synchronization unit 905 and/or the processing unit 901 being configured to, perform synchronization and random access with the UE 120 based on the UE configuration used for the handover request acknowledgement.

The target node 111 may further be configured to, e.g. by means of the communication unit 902 and/or the receiving unit 904 and/or the obtaining unit 906 and/or the processing unit 901 being configured to, obtain information regarding the updated configuration of the UE 120. In embodiments herein, the target node 111 is configured to, e.g. by means of the communication unit 902 and/or the receiving unit 904 and/or the obtaining unit 906 and/or the processing unit 901 being configured to, obtain, after performing the synchronization, the information regarding the updated configuration of the UE 120. The updated configuration is configured to have taken place since the handover request acknowledgement was sent to the source node 110. At least one of the following applies: i) the information is configured to be obtained from the UE 120 in the handover complete message, and ii) the information is configured to be obtained from the source node 110 at the time of the handover execution.

The target node 111 may lack a configuration to be informed by the UE 120 or the source node 110 about the reconfiguration after the reconfiguration, between when the conditional handover is configured and before the handover is executed.

In some embodiments, the target node 111 may be configured to receive, from the UE 120, the handover complete message comprising the indication that the configuration of the UE 120 has been updated since the handover request acknowledgement was sent to the source node 110.

The target node 111 may further be configured to, e.g. by means of the communication unit 902 and/or the receiving unit 904 and/or the obtaining unit 906 and/or the processing unit 901 being configured to, obtain the information about the updated configuration of the UE 120 by receiving the information about the updated configuration of the UE 120 from the source node 110. In some embodiments, the target node 111 may be configured to obtain the information about the updated configuration of the UE 120 by receiving the information about the updated configuration of the UE 120 from the source node 110.

The target node 111 may further be configured to, e.g. by means of the communication unit 902 and/or the receiving unit 904 and/or the obtaining unit 906 and/or the processing unit 901 being configured to, obtain the information about the updated configuration of the UE 120 by receiving the information about the updated configuration of the UE 120 from the UE 120.

The target node 111 may further be configured to, e.g. by means of the receiving unit 904 and/or the processing unit 901 being configured to, receive a handover complete message from the UE 120 comprising an indication that the configuration of the UE 120 has been updated since the handover request acknowledgement was sent to the source node 110.

The target node 111 may further be configured to, e.g. by means of the configuration unit 907 and/or the processing unit 901 being configured to, update the UE context based on the obtained information regarding the updated configuration of the UE 120. That is, the target node 111 may be further configured to, e.g. by means of the configuration unit 907 and/or the processing unit 901 being configured to, update, based on the information regarding the updated configuration of the UE 120, the context of the UE 120.

The target node 111 may further be configured to, e.g. by means of the communication unit 902 and/or the receiving unit 904 and/or the obtaining unit 906 and/or the processing unit 901 being configured to, receive the information about the updated configuration of the UE 120 as a complete configuration of the UE 120 and/or as the changes in relation to the previous configuration of the UE 120.

The target node 111 may further be configured to, e.g. by means of the determining unit 908 and/or the processing unit 901 being configured to, determine, based on the information about the updated configuration of the UE 120, to change parts of and/or the complete configuration of the UE 120.

The target node 111 may further be configured to, e.g. by means of the configuration unit 907 and/or the processing unit 901 being configured to, perform a reconfiguration of the UE 120 based on the determined changes.

Those skilled in the art will also appreciate that the synchronization unit 905, the obtaining unit 906, the configuration unit 907 and/or the determining unit 908 described above may refer to a combination of analog and digital circuits, and/or one or more processors configured with software and/or firmware, e.g. stored in the memory 909, that when executed by the one or more processors such as the processing unit 901 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Any of the synchronization unit 905, the obtaining unit 906, the configuration unit 907 and/or the determining unit 908 may be a processor of the target node 111, such as the processing unit 901, or an application running on such processor.

Figure 4:
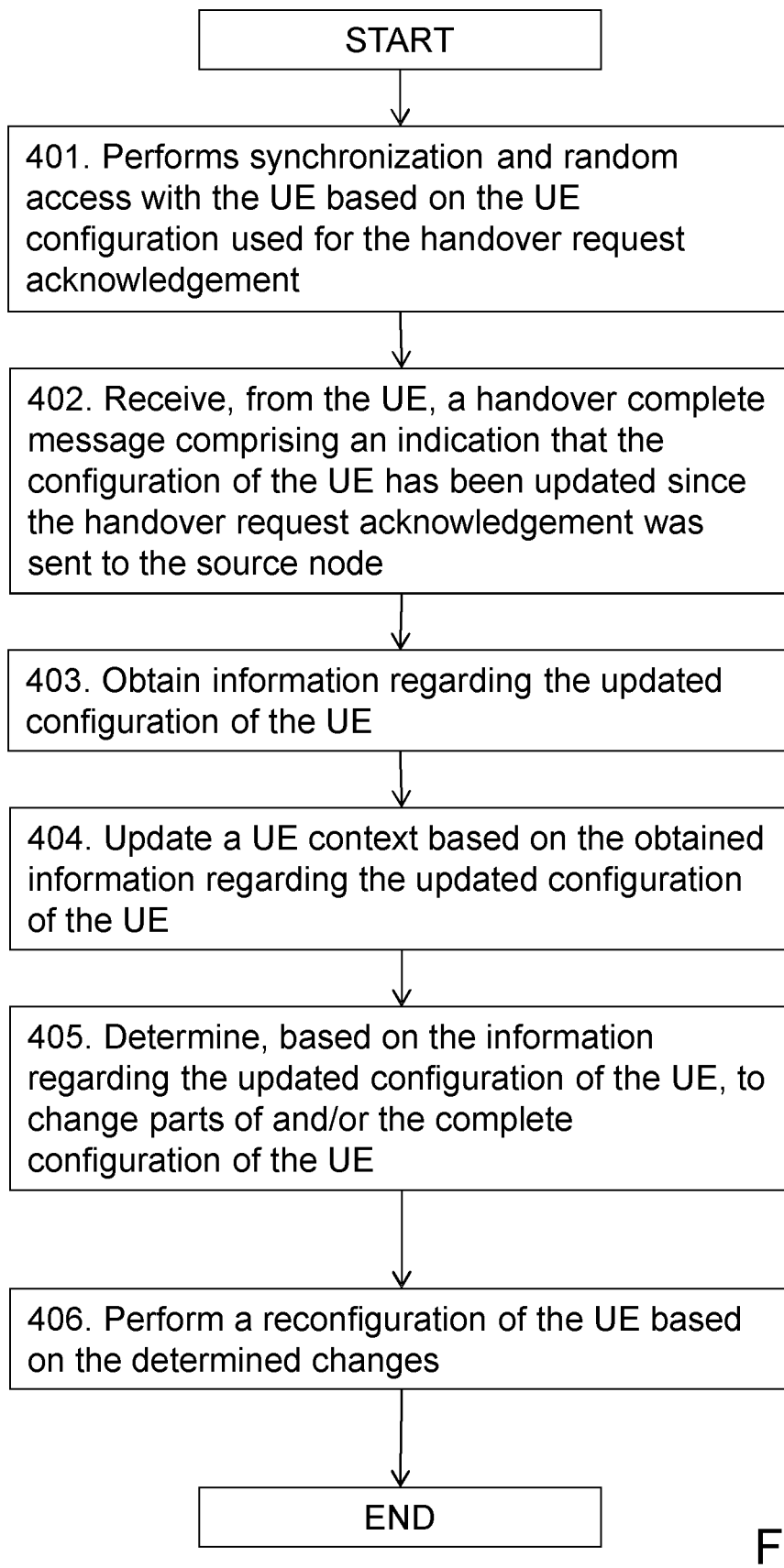
FIG. 4 is a flow chart illustrating embodiments of a method performed by a target node.
Figure 10:
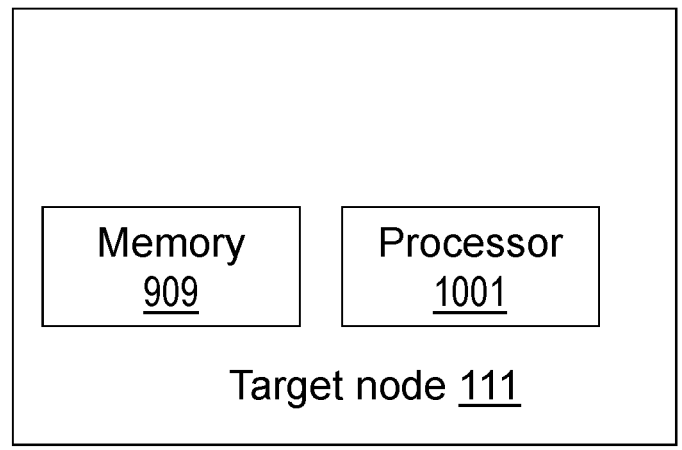
FIG. 10 is a schematic block diagram illustrating the target node according to some further embodiments herein.
Figure 10:
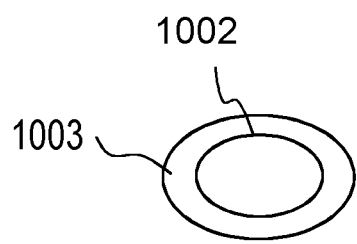

The embodiments herein for handling reconfigurations of the UE 120 during a conditional handover may be implemented through a respective processor or one or more processors of a processing circuitry 1001 in the target node 111 as depicted in FIG. 10, which processing circuitry 1001 is configured to perform the method actions according to FIG. 4 and the embodiments described above for the target node 111.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the target node 111. One such carrier may be in the form of a CD ROM disc. It is however feasible with other data carriers such as e.g. a memory stick. The computer program code may furthermore be provided as pure program code on a server and downloaded to the target node 111.

The target node 111 may further comprise the memory 909. The memory 909 may comprise one or more memory units to be used to store data on, such as the UE configurations, software, patches, system information (SI), configurations, diagnostic data, performance data and/or applications to perform the methods disclosed herein when being executed, and similar.

The method according to the embodiments described herein for the target node 111 may be implemented by means of e.g., a computer program product 910, 1002 or a computer program, comprising instructions, i.e., software code portions, which, when executed on at least one processor, cause at least one processor to carry out the actions described herein, as performed by the target node 111. The computer program product 910, 1002 may be stored on a computer-readable storage medium 911, 1003, e.g. a disc or similar. The computer-readable storage medium 911, 1003, having stored thereon the computer program, may comprise instructions which, when executed on at least one processor, cause the at least one processor to carry out the actions described herein, as performed by the target node 111. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the target node.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

Figure 11:
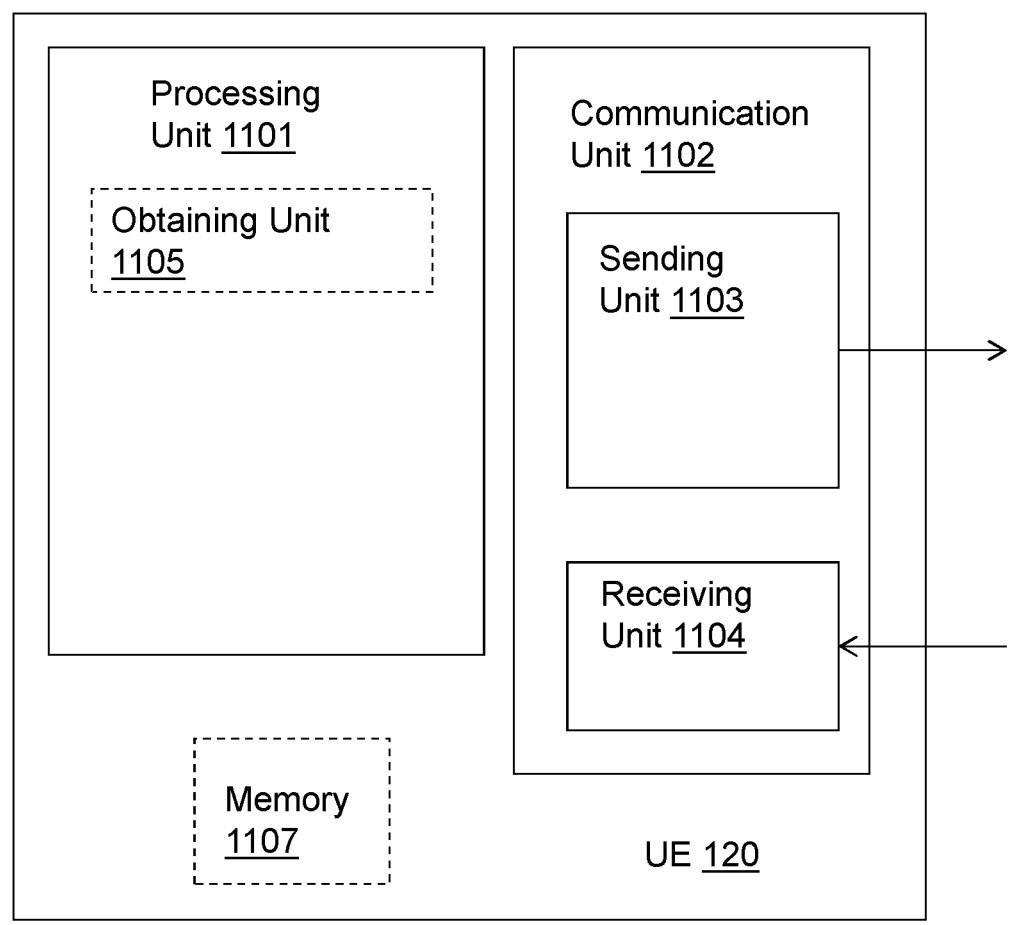
FIG. 11 is a schematic block diagram illustrating a UE according to some embodiments herein for obtaining technical details of a received service.

To perform the method actions for handling reconfigurations of the UE 120 during the conditional handover, described above in relation to FIG. 5, the UE 120 may comprise the following arrangement as depicted in FIG. 11. The UE 120 is configured to operate in the communications network 100.

The UE 120 may comprise a processing unit 1101 and a communication unit 1102 for communicating with network devices, such as the source node 110, the target node 111 or other UEs 120. The communication unit 1102 may comprise a sending unit 1103 and a receiving unit 1104.

The UE 120 may be configured to, e.g. by means of the communication unit 1102 and/or an obtaining unit 1105 and/or a receiving unit 1104 and/or the processing unit 1101 being configured to, receive the conditional handover message from the source node 110, wherein the conditional handover message may comprise the handover command prepared by the target node 111 based on the current configuration of the UE 120 and the condition for triggering the handover.

In embodiments herein, the UE 120 is configured to, e.g. by means of the communication unit 1102 and/or the obtaining unit 1105 and/or a receiving unit 1104 and/or the processing unit 1101 being configured to, receive, from the source node 110, the conditional handover message, comprising the handover command prepared by the target node 111 based on the current configuration of the UE 120 and the condition for triggering the handover.

The UE 120 may be configured to, e.g. by means of the communication unit 1102 and/or the obtaining unit 1105 and/or the receiving unit 1104 and/or the processing unit 1101 being configured to, receive a reconfiguration message from the source node 110. In embodiments herein, the UE 120 is configured to, e.g. by means of the communication unit 1102 and/or the obtaining unit 1105 and/or the receiving unit 1104 and/or the processing unit 1101 being configured to, receive, from the source node 110 and after having received the conditional handover message, the reconfiguration message.

The UE 120 may be configured to, e.g. by means of the communication unit 1102 and/or the sending unit 1103 and/or the receiving unit 1104 and/or the processing unit 1101 being configured to, perform a handover from the source node 110 to the target node 111. In embodiments herein, the UE 120 is configured to, e.g. by means of the communication unit 1102 and/or the sending unit 1103 and/or the receiving unit 1104 and/or the processing unit 1101 being configured to, perform, when the condition for triggering the handover is met, the handover from the source node 110 to the target node 111.

The UE 120 may be configured to, e.g. by means of the communication unit 1102 and/or the sending unit 1103 and/or the receiving unit 1104 and/or the processing unit 1101 being configured to, indicate, to the target node 111, that the configuration of the UE 120 has been updated since the handover command was received.

In embodiments herein, the UE 120 is configured to, e.g. by means of the communication unit 1102 and/or the sending unit 1103 and/or the receiving unit 1104 and/or the processing unit 1101 being configured to, when accessing the target node 111, after having received the reconfiguration message from the source node 110, indicate, to the target node 111, in the handover complete message, at least one of: i) the indication that the configuration of the UE 120 has been updated since the handover command was received by the UE 120, and ii) the information regarding the updated configuration of the UE 120.

The UE 120 may be configured to, e.g. by means of the communication unit 1102 and/or the receiving unit 1104 and/or the processing unit 1101 being configured to, receive, from the target node 111, a reconfiguration message comprising a partial or complete update of the UEs 120 configuration of the UE 120 based on the updated configuration of the UE 120. In embodiments herein, the UE 120 is configured to, e.g. by means of the communication unit 1102 and/or the receiving unit 1104 and/or the processing unit 1101 being configured to, receive, from the target node 111, after having indicated the at least one of the indication and the information, the reconfiguration message comprising the partial or the complete update of the configuration of the UE 120 based on the updated configuration of the UE 120.

The UE 120 may be further configured to refrain from informing the target node 111 about the reconfiguration after the reconfiguration may be performed, between when the conditional handover may be configured and before the handover may be executed.

Those skilled in the art will also appreciate that the obtaining unit 1105 described above may refer to a combination of analog and digital circuits, and/or one or more processors configured with software and/or firmware, e.g. stored in the memory 1107, that when executed by the one or more processors such as the processing unit 1101 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The obtaining 1105 may be a processor of the target node 111, such as the processing unit 901, or an application running on such processor.

Figure 5:
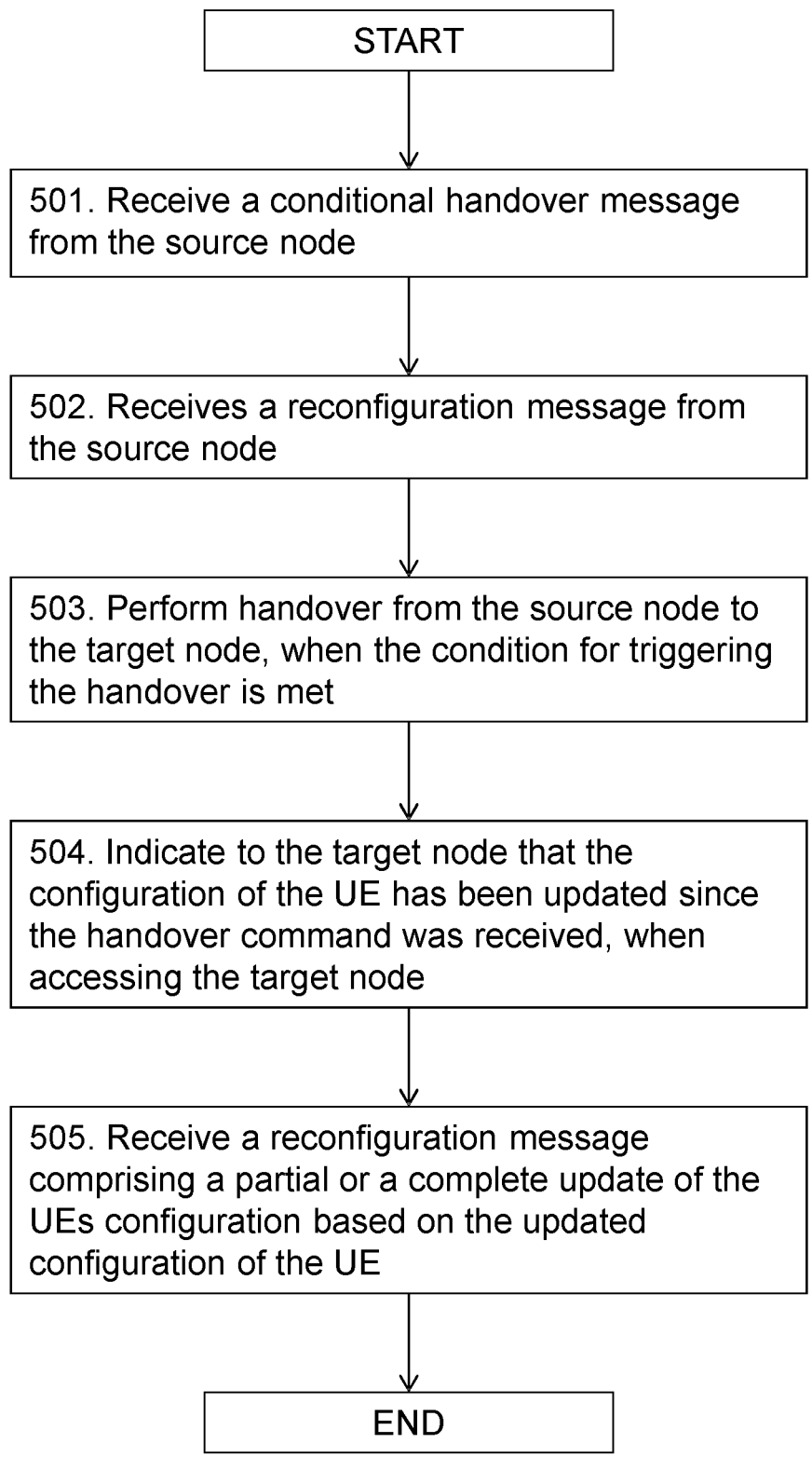
FIG. 5 is a flow chart illustrating embodiments of a method performed by a UE.
Figure 12:
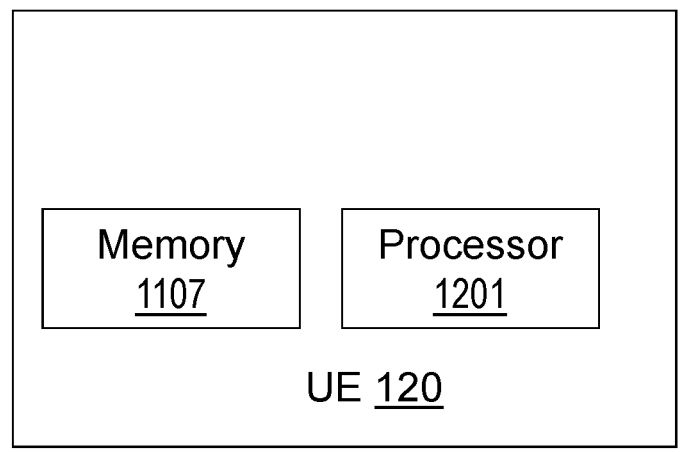
FIG. 12 is a schematic block diagram illustrating the UE according to some further embodiments herein for obtaining technical details of the received service.
Figure 12:
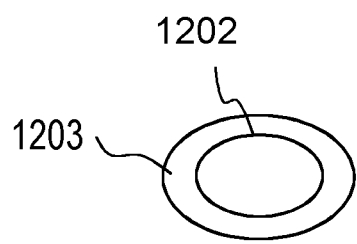

The embodiments herein for handling reconfigurations of the UE 120 during a conditional handover may be implemented through a respective processor or one or more processors of a processing circuitry 1201 in the UE 120 as depicted in FIG. 12, which processing circuitry 1201 is configured to perform the method actions according to FIG. 5 and the embodiments described above for the UE 120.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as e.g. a memory stick. The computer program code may furthermore be provided as pure program code on a server and downloaded to the UE 120.

The UE 120 may further comprise the memory 1107. The memory 1107 may comprise one or more memory units to be used to store data on, such as the UE configurations, software, patches, system information (SI), configurations, diagnostic data, performance data and/or applications to perform the methods disclosed herein when being executed, and similar.

The method according to the embodiments described herein for the UE 120 may be implemented by means of e.g. a computer program product 1108, 1202 or a computer program, comprising instructions, i.e., software code portions, which, when executed on at least one processor, cause at least one processor to carry out the actions described herein, as performed by the UE 120. The computer program product 1108, 1202 may be stored on a computer-readable storage medium 1109, 1203, e.g. a disc or similar. The computer-readable storage medium 1109, 1203, having stored thereon the computer program, may comprise instructions which, when executed on at least one processor, cause the at least one processor to carry out the actions described herein, as performed by the UE 120. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

Examples Related to Embodiments Herein

Examples related to embodiments herein will now be described in reference to FIG. 3, FIG. 4 and FIG. 5.

An example of a method performed by the source node 110 in the communications network 100, for handling reconfigurations of the User Equipment (UE) 120 during a conditional handover, will now be described with reference to the flowchart depicted in FIG. 3. A conditional handover has been configured, but the actual handover has not yet been performed. The handover may e.g., have been configured by the source node 110 sending a conditional handover request for the UE 120 to the target node 111 and receiving a handover request acknowledgement from the target node 111 based on the current configuration of the UE 120.

The method may comprise the following actions, which actions may be taken in any suitable order.

Action 4010 corresponding to Action 301

The source node 110 may send a conditional handover message to the UE 120. The conditional handover message may comprise a handover command prepared by the target node 111 based on the current configuration of the UE 120 and a condition for triggering the handover.

This action 4010 corresponds to the action 5 disclosed in relation to FIG. 6.

Action 4020 Corresponding to Action 302

The source node 110 may perform a reconfiguration of the UE 120. The reconfiguration may e.g., be performed due to changing conditions for the UE 120 in the communications network 100.

This action 4020 corresponds to the action 7 disclosed in relation to FIG. 6.

Action 4030 corresponding to Action 303

The source node 110 may receive an indication to release the UE 120 from the target node 111.

This action 4030 corresponds to the action 14 disclosed in relation to FIG. 6.

Action 4040 Corresponding to Action 304

The source node 110 may send information regarding the updated configuration of the UE 120, to the target node 111.

This action 4040 corresponds to the action 15 disclosed in relation to FIG. 6.

An example of a method performed by the target node 111 in the communications network 100, for handling reconfigurations of the UE 120 during a conditional handover, will now be described with reference to a flowchart depicted in FIG. 4. The target node 111 has received a conditional handover request for a UE 120 from a source node 110 and has sent a handover request acknowledgement to the source node 110 based on a current configuration of the UE 120.

The method may comprise the following actions, which actions may be taken in any suitable order.

Action 5010 corresponding to Action 401

The target node 111 may perform synchronization and random access with the UE 120 based on the UE configuration used for the handover request acknowledgement.

This action 5010 corresponds to the action 10 disclosed in relation to FIG. 6.

Action 5020 corresponding to Action 402

The target node 111 may receive, from the UE 120, a handover complete message comprising an indication that the configuration of the UE 120 has been updated since the handover request acknowledgement was sent to the source node 110.

This action 5020 corresponds to the action 11 disclosed in relation to FIG. 6.

Action 5030 corresponding to Action 403

The target node 111 may obtain information regarding the updated configuration of the UE 120.

The target node 111 may e.g., obtain the information by receiving the information about the updated configuration of the UE 120 from the source node 110.

The target node 111 may e.g., obtain the information by receiving the information about the updated configuration of the UE 120 from the UE 120.

The information about the updated configuration of the UE 120 may comprise a complete configuration of the UE 120 or may only indicate the changes made in relation to the previous configuration of the UE 120.

This action 5030 is similar to the action 15 disclosed in relation to FIG. 6.

Action 5040 corresponding to Action 404

The target node 111 may update a UE context based on the obtained information regarding the updated configuration of the UE 120.

Action 5050 corresponding to Action 405

The target node 111 may determine, based on the information regarding the updated configuration of the UE 120, to change parts of and/or the complete configuration of the UE 120.

This action 5050 is similar to the action 16 disclosed in relation to FIG. 6.

Action 5060 corresponding to Action 406

The target node 111 may perform a reconfiguration of the UE 120 based on the determined changes.

This action 5060 is similar to the action 16 disclosed in relation to FIG. 6.

An example of a method performed by the UE 120 in the communications network 100, for handling reconfigurations of the UE 120 during a conditional handover, will now be described with reference to a flowchart depicted in FIG. 5. The target node 111 has received a conditional handover request for the UE 120 from a source node 110 and has sent a handover request acknowledgement to the source node 110 based on the current configuration of the UE 120.

The method may comprise the following actions, which actions may be taken in any suitable order.

Action 6010 corresponding to Action 501

The UE 120 receives, from the source node 110, a conditional handover message. The conditional handover message comprises a handover command prepared by the target node 111 based on the current configuration of the UE 120 and a condition for triggering the handover.

This action 6010 is similar to the action 5 disclosed in relation to FIG. 6.

Action 6020 Corresponding to Action 502

The UE 120 receives, from the source node 110, a reconfiguration message. The reconfiguration may e.g., be performed due to changing conditions for the UE 120 in the communications network 100.

This action 6020 is similar to the action 7 disclosed in relation to FIG. 6.

Action 6030 corresponding to Action 503

When the condition for triggering the handover is met, the UE 120 performs a handover from the source node 110 to the target node 111.

This action 6030 is similar to the action 8 disclosed in relation to FIG. 6.

Action 6040 Corresponding to Action 504

When accessing the target node 111, the UE 120 indicates to the target node 111 that the configuration of the UE 120 has been updated since the handover command was received. The indication may e.g. be sent in a handover complete message.

The UE 120 may further indicate to the target node 111 which parts of the configuration that has been updated.

This action 6040 is similar to the action 11 disclosed in relation to FIG. 6.

Action 6050 Corresponding to Action 505

The UE 120 may further receive, from the target node 111, a reconfiguration message comprising a partial or a complete update of the UEs 120 configuration based on the updated configuration of the UE 120.

This action 6050 is similar to the action 16 disclosed in relation to FIG. 6.

Below, some particular examples 1-20 of these examples related to embodiments herein are described.

Example 1. A method, performed by a source node (110) in a communications network (100), for handling reconfigurations of a User Equipment, UE, (120) during a conditional handover, wherein the source node has sent a conditional handover request for a UE (120) to a target node (111) and has received a handover request acknowledgement from the target node (111) based on a current configuration of the UE (120), wherein the method comprises:

sending (X010), to the UE (120), a conditional handover message, comprising a handover command prepared by the target node (111) based on the current configuration of the UE (120) and a condition for triggering a handover, performing (X020) a reconfiguration of the UE (120), sending (X040), to the target node (111), information regarding the updated configuration of the UE (120).

Example 2. The method according to example 1, wherein the method further comprises:

receiving (X030), from the target node (111), an indication to release the UE (120).

Example 3. A method performed by a target node (111) in a communications network (100), for handling reconfigurations of a User Equipment, UE, (120) during a conditional handover, wherein the target node (111) has received a conditional handover request for a UE (120) from a source node (110) and has sent a handover request acknowledgement to the source node (110) based on a current configuration of the UE (120), wherein the method comprises:

performing (Y010) synchronization and random access with the UE (120) based on the UE configuration used for the handover request acknowledgement, receiving (Y020), from the UE (120), a handover complete message comprising an indication that the configuration of the UE (120) has been updated since the handover request acknowledgement was sent to the source node (110), obtaining (Y030) information regarding the updated configuration of the UE (120), Example 4. The method according to example 3, wherein the obtaining (Y030) comprises:

receiving (Y030a), from the source node (110), information about the updated configuration of the UE (120).

Example 5. The method according to example 3, wherein the obtaining Q comprises:

receiving (Y030b), from the UE (110), information about the updated configuration of the UE (120).

Example 6. The method according to any of the examples 3 to 5, wherein the information about the updated configuration of the UE (120), comprises a complete configuration of the UE (120) and/or the changes in relation to the previous configuration of the UE (120).

Example 7. The method according to any of the examples 3 to 6, wherein the method further comprises:

determining (Y050), based on the information regarding the updated configuration of the UE (120), to change parts of and/or the complete configuration of the UE (120), performing (Y060) a reconfiguration of the UE (120) based on the determined changes.

Example 8. A method performed by a user equipment, UE, (120) in a communications network (100), for handling reconfigurations of a User Equipment, UE, (120) during a conditional handover, wherein the target node (111) has received a conditional handover request for a UE (120) from a source node (110) and has sent a handover request acknowledgement to the source node (110) based on a current configuration of the UE (120), wherein the method comprises:

receiving (Z010), from the source node (110), a conditional handover message, comprising a handover command prepared by the target node (111) based on the current configuration of the UE (120) and a condition for triggering a handover, receiving (Z020), from the source node (110), a reconfiguration message, when the condition for triggering the handover is met, performing (Z030) a handover from the source node (110) to the target node (111), when accessing the target node (111), indicating (Z040), to the target node (111), that the configuration of the UE (120) has been updated since the handover command was received.

Example 9. The method according to example 8, wherein the method further comprises:

receiving (Z050), from the target node (111), a reconfiguration message comprising a partial or complete update of the UEs (120) configuration of the UE (120) based on the updated configuration of the UE (120).

Example 10. A source node (110) in a communications network (100), for handling reconfigurations of a User Equipment, UE, (120) during a conditional handover, wherein the source node has sent a conditional handover request for a UE (120) to a target node (111) and has received a handover request acknowledgement from the target node (111) based on a current configuration of the UE (120), wherein the source node (110) is configured to:

send, to the UE (120), a conditional handover message, comprising a handover command prepared by the target node (111) based on the current configuration of the UE (120) and a condition for triggering a handover, perform a reconfiguration of the UE (120), send, to the target node (111), information regarding the updated configuration of the UE (120).

Example 11. The source node (110) according to example 10, wherein the source node (110) further is configured to:

receive, from the target node (111), an indication to release the UE (120).

Example 12. A target node (111) in a communications network (100), for handling reconfigurations of a User Equipment, UE, (120) during a conditional handover, wherein the target node (111) has received a conditional handover request for a UE (120) from a source node (110) and has sent a handover request acknowledgement to the source node (110) based on a current configuration of the UE (120), wherein the target node (111) is configured to:

perform synchronization and random access with the UE (120) based on the UE configuration used for the handover request acknowledgement, receive, from the UE (120), a handover complete message comprising an indication that the configuration of the UE (120) has been updated since the handover request acknowledgement was sent to the source node (110), obtain information regarding the updated configuration of the UE (120), update a UE context based on the obtained information regarding the updated configuration of the UE (120).

Example 13. The target node (111) according to example 12, wherein the target node (111) is configured to obtain the information about the updated configuration of the UE (120) by receiving the information about the updated configuration of the UE (120) from the source node (110).

Example 14. The target node (111) according to example 12, wherein the target node (111) is configured to obtain the information about the updated configuration of the UE (120) by receiving the information about the updated configuration of the UE (120).

Example 15. The target node (111) according to any of the examples 12 to 14, wherein the target node (111) is configured to receive the information about the updated configuration of the UE (120) as a complete configuration of the UE (120) and/or as the changes in relation to the previous configuration of the UE (120).

Example 16. The target node (111) according to any of the examples 12 to 15, wherein the target node (111) further is configured to:

determine, based on the information about the updated configuration of the UE (120), to change parts of and/or the complete configuration of the UE (120), perform a reconfiguration of the UE (120) based on the determined changes.

Example 17. A user equipment, UE, (120) in a communications network (100), for handling reconfigurations of a User Equipment, UE, (120) during a conditional handover, wherein the target node (111) has received a conditional handover request for a UE (120) from a source node (110) and has sent a handover request acknowledgement to the source node (110) based on a current configuration of the UE (120), wherein the UE (120) is configured to:

receive, from the source node (110), a conditional handover message, comprising a handover command prepared by the target node (111) based on the current configuration of the UE (120) and a condition for triggering a handover, receive, from the source node (110), a reconfiguration message, perform a handover from the source node (110) to the target node (111), when accessing the target node (111), indicate, to the target node (111), that the configuration of the UE (120) has been updated since the handover command was received.

Example 18. The UE (120) according to example 17, wherein the UE (120) further is configured to:

receive, from the target node (111), a reconfiguration message comprising a partial or complete update of the UEs (120) configuration of the UE (120) based on the updated configuration of the UE (120).

Example 19. A computer program comprising instructions, which when executed by a processor, causes the processor to perform actions according to any of the Examples 1-11.

Example 20. A carrier comprising the computer program of Example 19, wherein the carrier is one of an electronic signal, an optical signal, an electromagnetic signal, a magnetic signal, an electric signal, a radio signal, a microwave signal, or a computer-readable storage medium.

Although the above embodiments and examples have been described using LTE terminology, the solution according to the embodiments and examples disclosed herein is applicable to both LTE and NR. When applied in NR, the above description text may be modified by replacing node with gNB, and replacing "handover command" with "RRCReconfiguration". When applied in LTE, the above description text may be modified by replacing node with eNB and replacing "handover command" with "RRCConnectionReconfiguration".

For LTE, the nodes and messages in the description may be mapped as follows:
RAN node↔eNB
NAS node↔MME
Handover command↔RRCConnectionReconfiguration message including MobilityControlInfo
Handover complete↔RRCConnectionReconfigurationComplete For NR, the nodes and messages in the description may be mapped as follows:
RAN node↔gNB
NAS node↔AMF
Handover command↔RRCReconfiguration message including reconfigurationWithSync
Handover complete↔RRCReconfigurationComplete When using the word "comprise" or "comprising" it shall be interpreted as non-limiting, i.e. meaning "consist at least of".

Further Extensions and Variations

Figure 13:
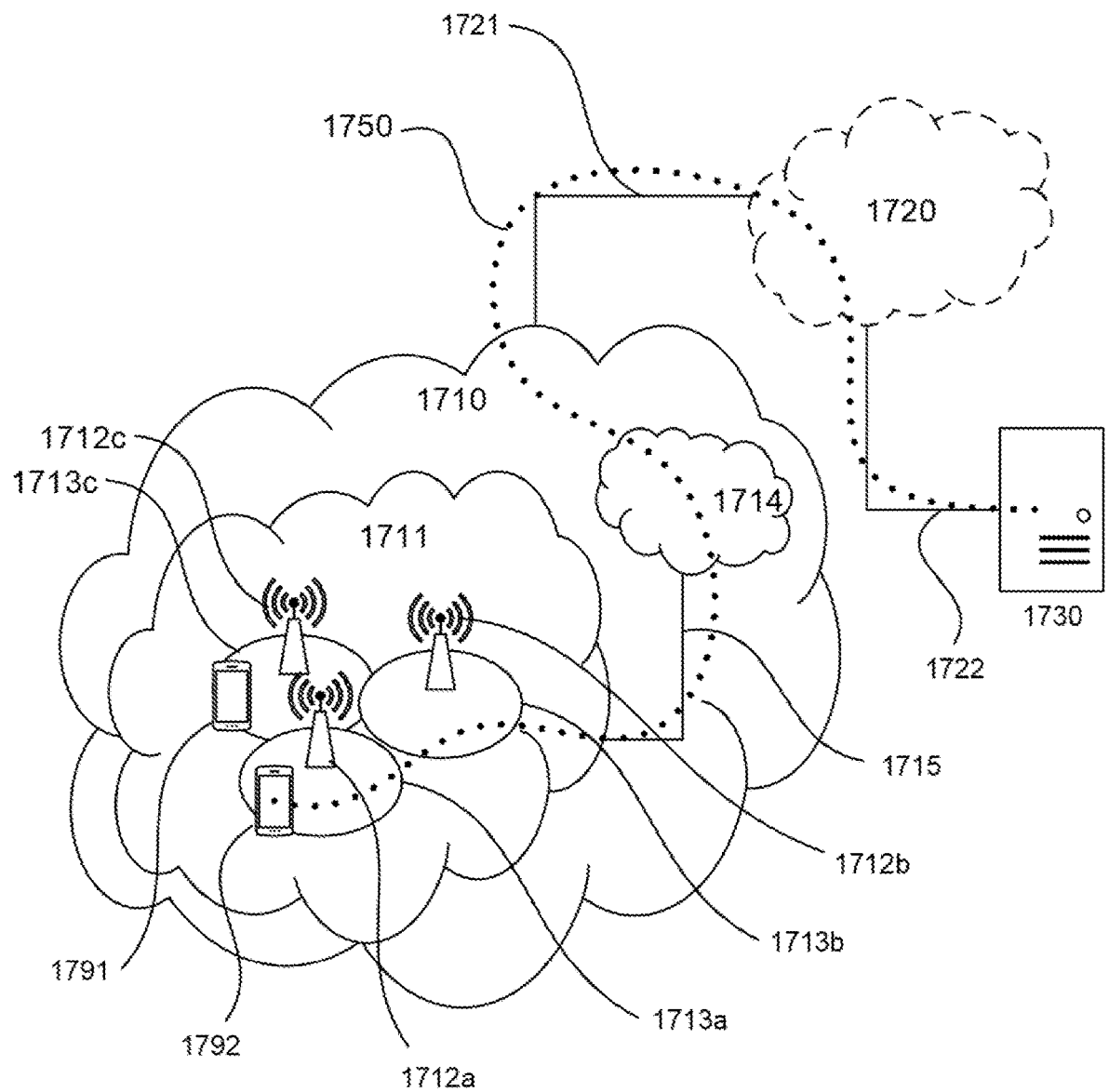
FIG. 13 is a schematic block diagram illustrating a host computer communicating via a base station with a user equipment over a partially wireless connection in accordance with some embodiments.

With reference to FIG. 13, in accordance with an embodiment, a communication system includes telecommunication network 1710, such as the communications network 100, for example, a 3GPP-type cellular network, which comprises access network 1711, such as a radio access network, and core network 1714. Access network 1711 comprises a plurality of base stations 1712a, 1712b, 1712c, e.g., the network node 110, 111 such as any of the source node 110 and the target node 111, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791, such as the UE 120, located in coverage area 1713c is configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 13 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink (UL) and downlink (DL) communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

In relation to FIGS. 14, 15, 16, 17, and 18, which are described next, it may be understood that a UE is an example of the UE 120, and that any description provided for the UE equally applies to the UE 120. It may be also understood that the base station is an example of the network node 110, 111, that is, any of the source node 110 and the target node 111, and that any description provided for the base station equally applies to the network node 110, 111, that is, any of the source node 110 and the target node 111.

Example implementations, in accordance with an embodiment, of the UE 120, e.g., a UE, the network node 110, 111, e.g., a base station and host computer discussed in the preceding paragraphs will now be described with reference to FIG. 14. In communication system 1800, such as the communications network 100, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Figure 14:
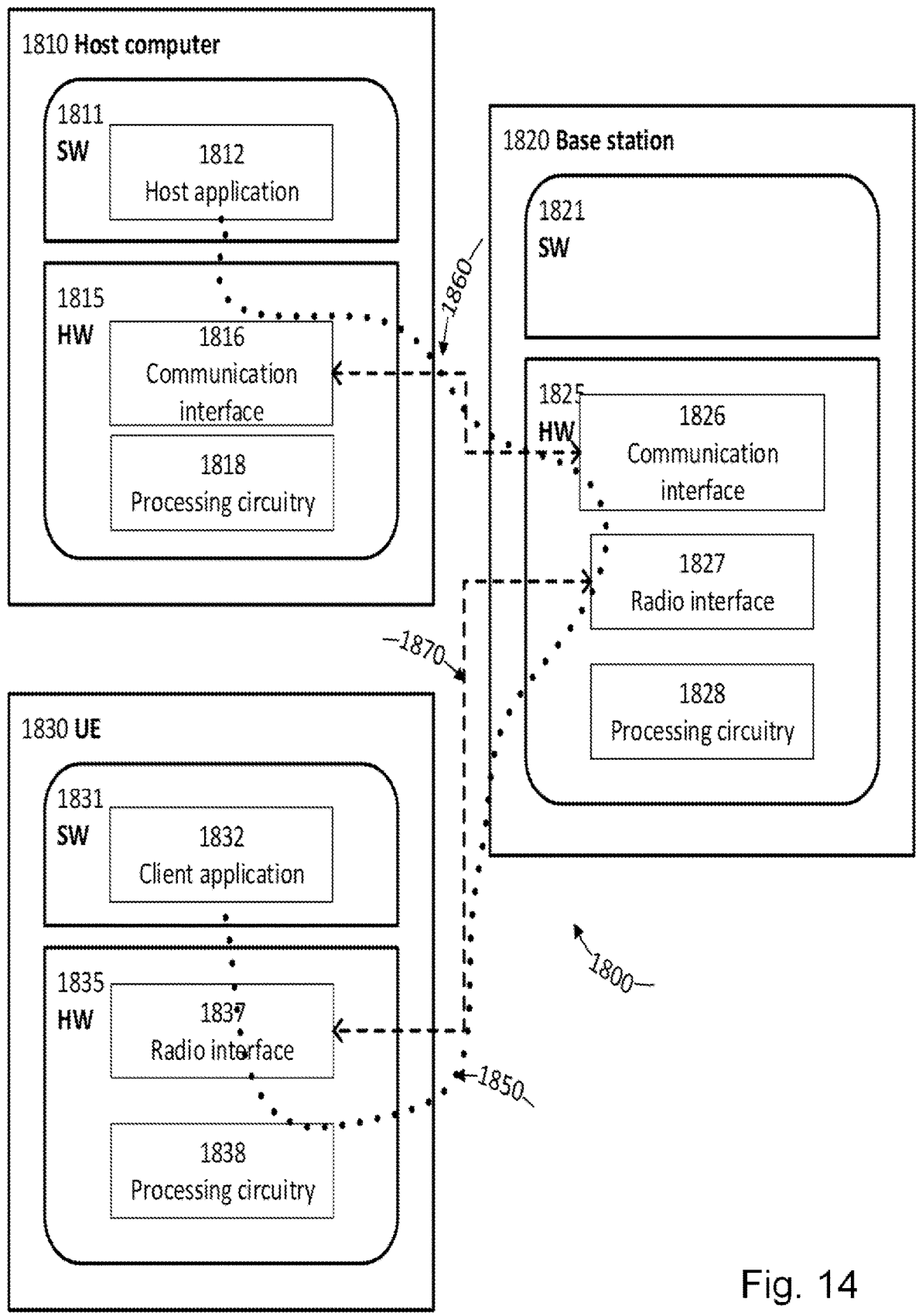
FIG. 14 is a schematic overview of a host computer communicating via a base station with a user equipment over a partially wireless connection in accordance with some embodiments.

Communication system 1800 further includes the network node 110, 111, exemplified in FIG. 14 as a base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with the UE 120, exemplified in FIG. 14 as a UE 1830 located in a coverage area (not shown in FIG. 14) served by base station 1820. Communication interface 1826 may be configured to facilitate connection 1860 to host computer 1810. Connection 1860 may be direct or it may pass through a core network (not shown in FIG. 14) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

It is noted that host computer 1810, base station 1820 and UE 1830 illustrated in FIG. 14 may be similar or identical to host computer 1730, one of base stations 1712a, 1712b, 1712c and one of UEs 1791, 1792 of FIG. 13, respectively. This is to say, the inner workings of these entities may be as shown in FIG. 14 and independently, the surrounding network topology may be that of FIG. 13.

In FIG. 14, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the teachings of these embodiments may reduce the risk of dropped calls due to failed conditional handovers and thereby provide benefits such as improved performance of the communications network, in particular when operating in areas with poor conditions.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figures 15, 16:
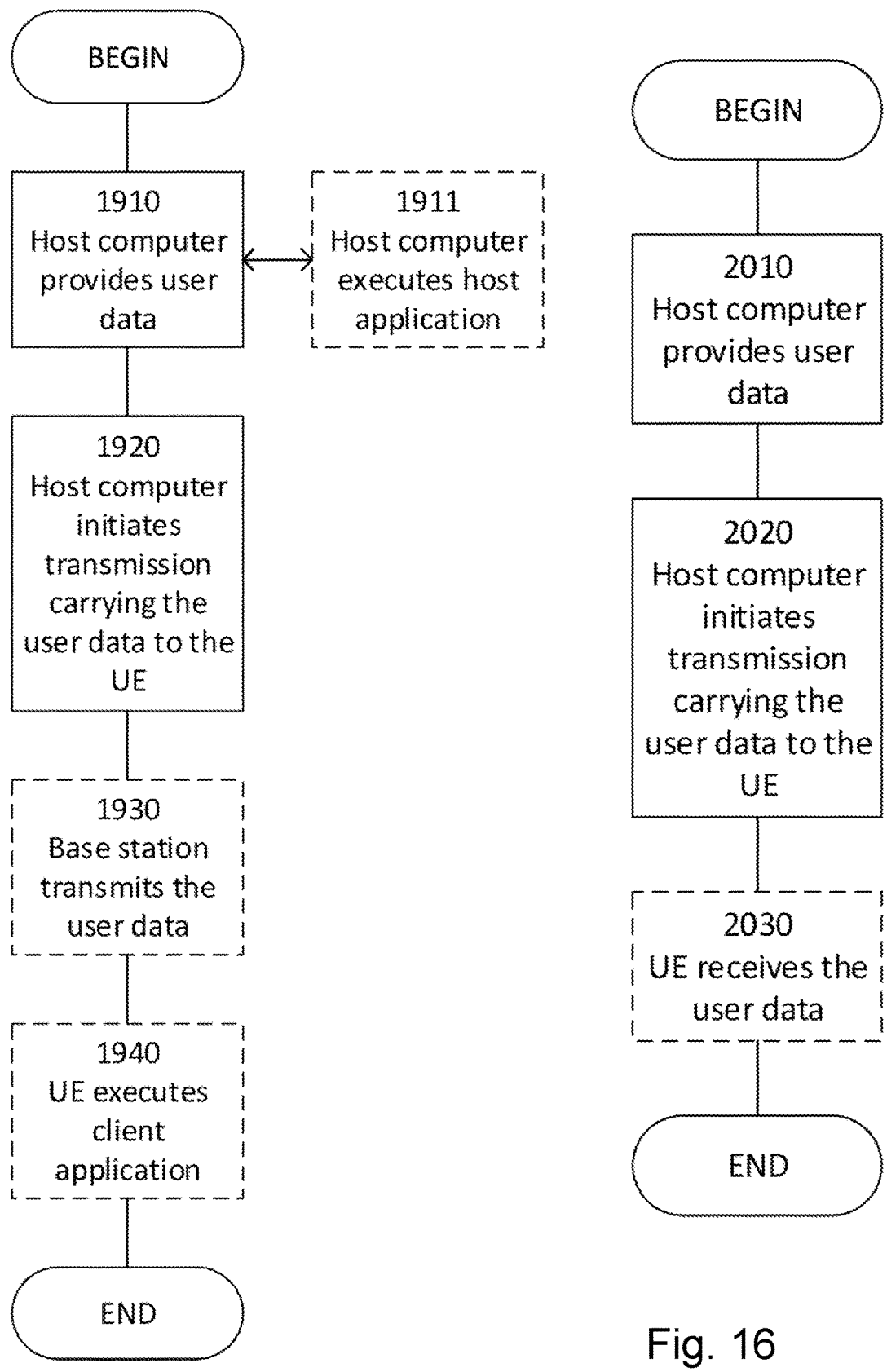
FIG. 15 is a flowchart depicting methods implemented in a communication system including a host computer, a base station and a user equipment in accordance with some embodiments.
FIG. 16 is a flowchart depicting methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 2110 (which may be optional), the UE receives input data provided by the host computer. Additionally or alternatively, in step 2120, the UE provides user data. In substep 2121 (which may be optional) of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Further Numbered Embodiments

1. A base station configured to communicate with a user equipment (UE), the base station comprising a radio interface and processing circuitry configured to perform one or more of the actions described herein as performed by the network node 110, 111, e.g., any of the source node 110 and the target node 111.
5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the network node 110, 111, e.g., any of the source node 110 and the target node 111.
6. The communication system of embodiment 5, further including the base station.
7. The communication system of embodiment 6, further including the UE, wherein the UE is configured to communicate with the base station.
8. The communication system of embodiment 7, wherein:
   the processing circuitry of the host computer is configured to execute a host application, thereby providing the user data; and
   the UE comprises processing circuitry configured to execute a client application associated with the host application.
11. A method implemented in a base station, comprising one or more of the actions described herein as performed by the network node 110, 111, e.g., any of the source node 110 and the target node 111.
15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by the network node 110, 111, e.g., any of the source node 110 and the target node 111.

16. The method of embodiment 15, further comprising:
at the base station, transmitting the user data.

17. The method of embodiment 16, wherein the user data is provided at the host computer by executing a host application, the method further comprising:
at the UE, executing a client application associated with the host application.

21. A user equipment (UE) configured to communicate with a base station, the UE comprising a radio interface and processing circuitry configured to perform one or more of the actions described herein as performed by the UE 120.

25. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to perform one or more of the actions described herein as performed by the UE 120.

26. The communication system of embodiment 25, further including the UE.

27. The communication system of embodiment 26, wherein the cellular network further includes a base station configured to communicate with the UE.

28. The communication system of embodiment 26 or 27, wherein:
the processing circuitry of the host computer is configured to execute a host application, thereby providing the user data; and
the UE's processing circuitry is configured to execute a client application associated with the host application.

31. A method implemented in a user equipment (UE), comprising one or more of the actions described herein as performed by the UE 120.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions described herein as performed by the UE 120.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by the UE 120.

45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions described herein as performed by the UE 120.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the UE 120.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the UE 120.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by the network node 110, 111, e.g., any of the source node 110 and the target node 111.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110, 111, e.g., any of the source node 110 and the target node 111.
66. The communication system of embodiment 65, further including the base station.
67. The communication system of embodiment 66, further including the UE, wherein the UE is configured to communicate with the base station.
68. The communication system of embodiment 67, wherein:
the processing circuitry of the host computer is configured to execute a host application;
the UE is configured to execute a client application associated with the host application, thereby providing the user data to be received by the host computer.
71. A method implemented in a base station, comprising one or more of the actions described herein as performed by the network node 110, 111, e.g., any of the source node 110 and the target node 111.
75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the UE 120.
76. The method of embodiment 75, further comprising:
at the base station, receiving the user data from the UE.
77. The method of embodiment 76, further comprising:
at the base station, initiating a transmission of the received user data to the host computer.

The invention claimed is:

1. A method, performed by a target node in a communications network, for handling reconfigurations of a User Equipment (UE) during a conditional handover; wherein the target node has received a conditional handover request for the UE from a source node and has sent a handover request acknowledgement to the source node based on a current configuration of the UE; method comprising the target node:
performing synchronization and random access with the UE based on the UE configuration used for the handover request acknowledgement; and
obtaining, after performing the synchronization, information regarding an updated configuration of the UE, the updated configuration having taken place since the handover request acknowledgement was sent to the source node;
wherein the information is obtained from the UE in a handover complete message and/or the information is obtained from the source node at the time of the handover execution.

2. The method of claim 1, wherein the target node is not informed by the UE or the source node about the reconfiguration after the reconfiguration, between when the conditional handover is configured and before the handover is executed.

3. The method of claim 1, wherein the method further comprises receiving, from the UE, the handover complete message comprising an indication that the configuration of the UE has been updated since the handover request acknowledgement was sent to the source node.

4. The method of claim 1, wherein the obtaining comprises receiving, from the source node, the information about the updated configuration of the UE.

5. The method of claim 1, wherein the obtaining comprises receiving, from the UE, the information about the updated configuration of the UE.

6. The method of claim 1, wherein the information about the updated configuration of the UE comprises a complete configuration of the UE and/or the changes in relation to the previous configuration of the UE.

7. The method of claim 1, wherein the method further comprises:
updating, based on the information regarding the updated configuration of the UE, a context of the UE;
determining, based on the information regarding the updated configuration of the UE, to change parts of and/or a complete configuration of the UE; and
performing a reconfiguration of the UE based on the determined changes.

8. A method, performed by a User Equipment (UE) in a communications network, for handling reconfigurations of the UE during a conditional handover, method comprising the UE:
receiving, from a source node, a conditional handover message comprising a handover command prepared by a target node based on a current configuration of the UE and a condition for triggering a handover;
receiving, from the source node and after having received the conditional handover message, a reconfiguration message;
when the condition for triggering the handover is met, performing a handover from the source node to the target node; and
when accessing the target node after having received the reconfiguration message from the source node, indicating, to the target node and in a handover complete message:
an indication that the configuration of the UE has been updated since the handover command was received by the UE; and/or
information regarding the updated configuration of the UE.

9. The method of claim 8, further comprising the UE refraining from informing the target node about the reconfiguration after the reconfiguration is performed, between when the conditional handover is configured and before the handover is executed.

10. The method of claim 8, further comprising receiving, from the target node, after having indicated the indication and/or the information, a reconfiguration message comprising a partial or a complete update of the configuration of the UE based on the updated configuration of the UE.

11. A method, performed by a source node in a communications network, for handling reconfigurations of a User Equipment (UE) during a conditional handover; wherein the source node has sent a conditional handover request for a UE to a target node and has received a handover request acknowledgement from the target node based on a current configuration of the UE; the method comprising the source node:
sending, to the UE, a conditional handover message comprising a handover command prepared by the target node based on the current configuration of the UE and a condition for triggering a handover;
performing a reconfiguration of the UE after having sent the conditional handover message; and
sending, to the target node, at the time of the handover execution, information regarding the updated configuration of the UE.

12. The method of claim 11, further comprising the source node refraining from informing the target node about the reconfiguration after the reconfiguration is performed, between when the conditional handover is configured and before the handover is executed.

13. The method of claim 11, further comprising receiving, from the target node before having sent the information to the target node, an indication to release the UE.

14. A target node in a communications network, for handling reconfigurations of a User Equipment (UE) during a conditional handover; wherein the target node is configured to have received a conditional handover request for a UE from a source node and is configured to have sent a handover request acknowledgement to the source node based on a current configuration of the UE; the target node comprising:
   processing circuitry;
   memory containing instructions executable by the processing circuitry whereby the target node is operative to:
      perform synchronization and random access with the UE based on the UE configuration configured to be used for the handover request acknowledgement;
      obtain, after performing the synchronization, information regarding an updated configuration of the UE, the updated configuration being configured to have taken place since the handover request acknowledgement was sent to the source node;
      wherein the information is obtained from the UE in a handover complete message and/or the information is obtained from the source node at the time of the handover execution.

15. The target node of claim 14, wherein the target node lacks a configuration to be informed by the UE or the source node about the reconfiguration after the reconfiguration, between when the conditional handover is configured and before the handover is executed.

16. The target node of claim 14, wherein the instructions are such that the target node is operative to receive, from the UE, a handover complete message comprising an indication that the configuration of the UE has been updated since the handover request acknowledgement was sent to the source node.

17. The target node of claim 14, wherein the instructions are such that the target node is operative to obtain the information about the updated configuration of the UE by receiving the information about the updated configuration of the UE from the source node.

18. The target node of claim 14, wherein the instructions are such that the target node is operative to obtain the information about the updated configuration of the UE by receiving the information about the updated configuration of the UE from the UE.

19. The target node of claim 14, wherein the instructions are such that the target node is operative to receive the information about the updated configuration of the UE as a complete configuration of the UE and/or as the changes in relation to the previous configuration of the UE.

20. The target node of claim 14, wherein the instructions are such that the target node is operative to:
   update, based on the information regarding the updated configuration of the UE, a context of the UE;
   determine, based on the information about the updated configuration of the UE, to change parts of and/or a complete configuration of the UE; and
   perform a reconfiguration of the UE based on the determined changes.

21. The target node of claim 14, wherein the instructions are such that the target node is operative to receive the information about the updated configuration of the UE as a complete configuration of the UE and/or as the changes in relation to the previous configuration of the UE.

22. A user equipment (UE) in a communications network, for handling reconfigurations of the UE during a conditional handover, the UE comprising:
   processing circuitry;
   memory containing instructions executable by the processing circuitry whereby the UE is operative to:
      receive, from a source node, a conditional handover message comprising a handover command prepared by a target node based on a current configuration of the UE and a condition for triggering a handover;
      receive, from the source node and after having received the conditional handover message, a reconfiguration message;
      perform, when the condition for triggering the handover is met, a handover from the source node to the target node;
      when accessing the target node, after having received the reconfiguration message from the source node, indicate, to the target node, in a handover complete message:
         an indication that the configuration of the UE has been updated since the handover command was received by the UE; and/or
         information regarding the updated configuration of the UE.

23. The UE of claim 22, wherein the instructions are such that the UE is operative to refrain from informing the target node about the reconfiguration after the reconfiguration is performed, between when the conditional handover is configured and before the handover is executed.

24. The UE of claim 22, wherein the instructions are such that the UE is operative to receive, from the target node, after having indicated the at least one of the indication and the information, a reconfiguration message comprising a partial or a complete update of the configuration of the UE based on the updated configuration of the UE.

25. A source node in a communications network, for handling reconfigurations of a User Equipment (UE) during a conditional handover; wherein the source node has sent a conditional handover request for a UE to a target node and has received a handover request acknowledgement from the target node based on a current configuration of the UE; the source node comprising:
   processing circuitry;
   memory containing instructions executable by the processing circuitry whereby the source node is operative to:
      send, to the UE, a conditional handover message comprising a handover command prepared by the target node based on the current configuration of the UE and a condition for triggering a handover;
      perform a reconfiguration of the UE after having sent the conditional handover message; and
      send, to the target node, at the time of the handover execution, information regarding the updated configuration of the UE.

26. The source node of claim 25, wherein the instructions are such that the source node is operative to refrain from informing the target node about the reconfiguration after the reconfiguration is performed, between when the conditional handover is configured and before the handover is executed.

27. The source node of claim 25, wherein the instructions are such that the source node is operative to receive, from the target node after having sent the information to the target node, an indication to release the UE.

\* \* \* \* \*